US012592839B2

(12) United States Patent
Cambou et al.

(10) Patent No.: US 12,592,839 B2
(45) **Date of Patent: *Mar. 31, 2026**

(54) PUF-PROTECTED PSEUDO-HOMOMORPHIC METHODS TO GENERATE SESSION KEYS

(71) Applicant: Arizona Board of Regents on Behalf of Northern Arizona University, Flagstaff, AZ (US)

(72) Inventors: Bertrand F. Cambou, Flagstaff, AZ (US); Donald A. Telesca, Rome, NY (US); H. Shelton Jacinto, Rome, NY (US)

(73) Assignees: Arizona Board of Regents on Behalf of Northern Arizona University, Flagstaff, AZ (US); Government of the United States as Represented by the Secretary of the Air Force, Rome, NY (US)

( * ) Notice: Subject to any disclaimer, the term of this patent is extended or adjusted under 35 U.S.C. 154(b) by 67 days.

This patent is subject to a terminal disclaimer.

(21) Appl. No.: 18/886,833

(22) Filed: Sep. 16, 2024

(65) Prior Publication Data
US 2025/0007737 A1 Jan. 2, 2025

Related U.S. Application Data

(63) Continuation of application No. 17/879,697, filed on Aug. 2, 2022, now Pat. No. 12,095,933.

(Continued)

(51) Int. Cl.
| H04L 29/06 | (2006.01) |
| H04L 9/14 | (2006.01) |
| H04L 9/32 | (2006.01) |

(52) U.S. Cl.
CPC .............. H04L 9/3278 (2013.01); H04L 9/14 (2013.01); H04L 9/3236 (2013.01)

(58) Field of Classification Search
CPC ....... H04L 9/3278; H04L 9/14; H04L 9/3236; H04L 9/0643; H04L 9/0894; H04L 9/008
See application file for complete search history.

(56) References Cited

U.S. PATENT DOCUMENTS

2011/0103161 A1* 5/2011 Tuyls ................... G11C 7/1006
                                                            365/189.16
2022/0164433 A1* 5/2022 Camilleri .............. H04L 9/3278
(Continued)

*Primary Examiner* — Mahfuzur Rahman
(74) *Attorney, Agent, or Firm* — Quarles & Brady LLP

(57) ABSTRACT

Systems and methods for the generation and use of session keys supporting secure communications between a client and server device are disclosed. The client device has or receives a password, which it hashes a predetermined first number of times. The hashed password is sent as a message digest to a server. The server applies the hashed password to an array of PUF devices, and receives a response bitstream which is stored. The client later hashes the password a second predetermined number of times, which is less than the first predetermined number, and this second message digest is sent to the server. The server continues to hash the second message digest, generate PUF responses, and compare the result to the initially stored responses. The number of hashes necessary to achieve a match is the session key.

16 Claims, 11 Drawing Sheets

Related U.S. Application Data

(60) Provisional application No. 63/228,564, filed on Aug. 2, 2021.

(56) References Cited

U.S. PATENT DOCUMENTS

| 2022/0417043 | A1* | 12/2022 | Cambou | ............... H04L 9/0822 |
|---|---|---|---|---|
| 2023/0281292 | A1* | 9/2023 | Wu | ......................... G06F 21/73 |
| | | | | 713/189 |

* cited by examiner

High throughput-PUF protocol - Step2: 1st authentication

Client 805

$H^{P_{1,1}}(PW_1) = MD_{1,1}$ $H^{P_{2,1}}(PW_2) = MD_{2,1}$ $H^{P_{3,1}}(PW_3) = MD_{3,1}$ $H^{P_{4,1}}(PW_4) = MD_{4,1}$ $P_{i,1} \in \{100, 160\}$

Session key: $\Pi_{1,4}(P_{i,0} - P_{i,1} + 1)$

Second authentication

$H^{P_{i,1}-1}(PW_i) = MD_{i,2}$

Session key: $\Pi_{1,4}(P_{i,0} - P_{i,1} + 1)$

Server 810

$MD_{1,1}; MD_{2,1}; MD_{3,1}; MD_{4,1}$

PUF $H^{X_{1,1}}(MD_{1,1}) \oplus H^{X_{2,1}}(MD_{2,1}) \oplus H^{X_{3,1}}(MD_{3,1}) \oplus H^{X_{4,1}}(MD_{4,1})$
$\approx R_{1,0}$ Session key: $\Pi_{1,4}(X_{i,1})$

PUF-PROTECTED PSEUDO-HOMOMORPHIC METHODS TO GENERATE SESSION KEYS

CROSS-REFERENCE TO RELATED APPLICATIONS

This application is a continuation of U.S. patent application Ser. No. 17/879,697, filed under the same title on Aug. 2, 2022, which claims priority to U.S. Provisional Application 63/228,564, filed on Aug. 2, 2021, which are herein incorporated by reference in their entirety for all purposes.

STATEMENT REGARDING FEDERALLY-SPONSORED RESEARCH

This disclosure was supported by the United States Government under Grant No. FA8750-19-2-0503 awarded by the Information Directorate under AFRL. The Government may have certain rights to inventions described herein.

BACKGROUND OF THE INVENTION

Central organizations managing networks of computing devices, such as private enterprises, financial organizations, governments, and commercial entitles face ongoing challenges by malicious actors seeking to gain access to secure systems with sensitive information. Such entitles generally implement stringent methods to prevent malicious use. Examples include requests to users and client devices to frequently change passwords, supply tokens generated by multi-factor authentication and mandatory software updates. Users of such systems are accustomed to handle such mandatory requests in a routine manner, without verifying that the server managing security is legitimate. There is, in most organizations, a tacit asymmetry: the users need to prove their identity, while the servers are assumed to be authentic and are operating un-checked. This situation is responsible for a large portion of cyberattacks, particularly attacks that manage to spoof communications that appear as though they are originating with an authority trusted by users.

Central organizations managing networks of client devices, such as private enterprises, financial organizations, governments, and commercial entities are implementing stringent methods to prevent malicious use. Examples include requests to frequently change passwords, multi-factor authentication, and mandatory software updates. The users are trained to handle such mandatory requests, without verifying that the server managing security is legitimate. There is a tacit asymmetry: the users need to prove their identity, while the servers are largely operating un-checked. This situation is responsible for a large portion of successful cyberattacks.

Successful attacks of this sort can result in stealing large databases of passwords or malicious servers pretending to be legitimate downloading malware to large numbers of client devices. The risk factors increase when the servers handling security are mobile or distributed and when the servers are exposed to insiders, who may gain access to the personal information of the users such as passwords, user IDs, and personal databases. This creates a zero-trust environment, in which additional protection of the network of users are important.

It is typical in a secure enterprise computing environment to centrally maintain a list of passwords supplied to users (e.g., of client devices) to verify their identity. The database containing the list of passwords of a network of users can be exposed to insider attacks; therefore, it is highly desirable that the password manager converts each password with one-way cryptographic functions such as hash functions, which enables more secure storage. The resulting message digests are stored as references for future authentications. During authentication cycles the password manager converts passwords supplied by users with the same one-way cryptographic function (e.g., a hash), then compares the resulting message digest with the one stored in the database. The databases of message digests are much more difficult to attack, and such schemes offer a higher level of protection. However, password guessing techniques can be effective to attack preliminary hashed stored passwords. Accordingly, conventional systems for server authentication, password management and client (user) authentication are amendable to improvement.

BRIEF SUMMARY

Embodiments of the invention are directed to a system for generating session keys for authenticating a typically time-limited communication session between a server and a client, and/or for encrypting communications occurring during that session. In certain embodiments, a server device acting as a password management has or is in secure electronic communication with an addressable array of physical-unclonable-function ("PUF") devices. The PUF devices generate an unpredictable, but repeatable, response when subjected to a stimulus, which may include measuring a physical characteristic of the device. Suitable PUF devices and circuitry for interacting therewith are described in additional detail below.

In some embodiments, in an enrollment cycle, a client device receives a password (e.g., from a user enrolling the device, or from storage, or as a perturbation of a previously stored password). The client device applies a one-way cryptographic function to the password (e.g., a hash) to the password a first predetermined number of times. That is to say, the client hashes the password, hashes the hash, etc., a first determined number of times. The iteratively hashed password is then sent to a server device. The client uses the received hashed password as a challenge to its PUF, or generates challenge instructions on the basis of the hashed password. This may involve using the hashed password to generate a first set of addresses of PUF devices to measure. The result of the challenge process is a first PUF response corresponding to the hashed password. That response is stored at the server as a password reference. Neither the hashed password, nor the password itself is stored in any device, however, the client device stores a number $P_0$, which represents the number of times the one-way cryptographic function was applied to the password. This number may be selected from numbers within a predetermined range, with the exact number being generated by a random number generator.

During an authentication cycle, the client device receives the password again (e.g., from a user). In other, non-preferred embodiments, the client device may receive the password from storage, e.g., network connected storage, or non-volatile memory on the client device. The client device then applies to the password the same one-way cryptographic function applied during the enrollment cycle, iteratively, a second predetermined number of times $P_1$, the second predetermined number of times being less than the first predetermined number of times. The second predetermined number of hashing cycles is within a predetermined range, but the exact number of times may be determined by an RNG. The difference between the first and second number of hashing cycles, $P_0$-$P_1$ may be used as a session key. The password that has been hashed $P_1$ times is then sent to the server/password manager, which attempts to find the quantity $P_0$-$P_1$. The server iteratively hashes the received message digest, applies the result as a PUF challenge, and compares the responses to the response stored during enrollment. At the number of hashing cycles required to get to the original response with the new message digest is $P_0$-$P_1$, so when this occurs, the server has generated a matching session key.

The session keys may be used in a number of ways to support authentication and cryptographic communication functions. For example, the server may hash the session key and send it to the client as an authentication message digest. The client, using the same hash, may hash its own session key and compare the result to the received hash from the server. If the hashes match, the server is authentic, and the client may communicate with it. If not, the client may refuse communication. Similarly, rather than hashing the key the server may encrypt it using a symmetrical or asymmetrical encryption key shared with the client (i.e., using a symmetrical key in possession of the client, or using a public key, where the corresponding private key is in possession of the client). The client may then decrypt the key and compare it to its own. Any key generation algorithm is suitable for use in such embodiments, for example, AES, ECC, LWE, NTRU or code-based cryptography.

In other embodiments, the pair of session keys may be used as or as seeds for the generation of encryption keys which may be used to support cryptographic communication between the devices. This may be done after expanding or further randomizing the keys, with the same process being performed at both server and client. For example, each device may XOR each key with the same random number or each device may apply the key to an expanded output function which outputs a message of the appropriate bit length for a keying algorithm. Hashing, then applying the hashes to a keying algorithm for key generation is also within the scope of inventive embodiments.

In one embodiment, a method of generating and using a session key at a server device having a first physical-unclonable-function ("PUF") array of addressable of PUF devices is provided. According to the method, the server receives a first message digest, the first message digest comprising a password that has been iteratively hashed a first predetermined number of times according to a hashing method. From the message digest, the server generates a series of PUF challenges, e.g., a series of addresses of individual PUF devices within an addressable array. The server then applies the challenges, or measures a physical characteristic of the devices identified by address. The server then stores the resulting bitstream, but not the received message digest. These steps may occur in an secure environment during an enrollment cycle.

To generate a session key, the server receives a second message digest, the second message digest comprising the password that has been iteratively hashed a second predetermined number of times by the hashing method, the second predetermined number of times being less than the first predetermined number of times. To determine the difference between the first and second number of hashes, the server iteratively performs the following steps n times until a stop (matching) condition is reached:

hashing the second message digest using the hashing method;

generating from the hashed second message a series of PUF challenges;

applying the PUF challenges to the first array of addressable PUF devices;

receiving another response bitstream from the first array of addressable PUF responses corresponding to the PUF challenges; and comparing the received response bitstream to the first response bitstream, wherein the stop condition is reached when the received response bitstream matches the first response bitstream.

When a match condition is achieved, the server has uncovered the session key, which was the number of additional hashes necessary to convert the second message digest to the first message digest.

On the client side, an exemplary method of cryptographic communication with a server device having a first physical-unclonable-function ("PUF") array of addressable of PUF devices is provided. According to the method, the client device receives, or retrieves or generates a password. The client then applies a one-way cryptographic function to the password a first predetermined number of times resulting in a first hashed password. This is transmitted to a server device as a first message digest, securely, as part of an enrollment process.

Later, the client the client applies the same one way cryptographic function to the password a second predetermined number of times, the second predetermined number of times being less than the first predetermined number of times resulting in a second hashed password. The client transmits the second hashed password to the server as a second message digest. The client then generates a client session key reflecting a difference between the first and second predetermined number of times.

The client then receives, from the server, a third message digest wherein the third message digest was generated with a server session key generated with the assistance of the server's first PUF array. The client then determines whether the third message digest was generated with a server session key matching the client session key. If so, the devices have the same session keys, and the server is authenticated. The devices may also use the session keys to generate cryptographic key pairs (symmetrical or asymmetrical) to support further communication. A PUF image pair, where the client has a PUF and the server has that PUF's image may be used for cryptographic key pair generation.

The concepts above may be extended. In some embodiments, a client receives, generates and/or retrieves multiple passwords. Each password is iteratively hashed a first predetermined number of times (the first predetermined number of times being optionally different for each password). The hashed passwords are sent as first individual message digests to a server. The server may have multiple PUFs, and the message digests are applied to one or more of the server PUFs to generate response bitstreams, one per password. The message digests are then deleted. This exchange occurs securely, during an enrollment process.

Later, to generate session keys, the client hashes the passwords a second predetermined number of times (again, which may be different for each password), where the second predetermined number of times is less (for each password) than the first predetermined number of times. These hashes are sent as second individual message digests to the server. The client generates a session key as a function of the difference between the first and second number of hashes for all passwords, for example, a multiplication, addition, or XOR of this quantity for all passwords. In one embodiment the session key is the product of the first and second predetermined number across all passwords.

To recover the session key, the server takes the second message digest for each password, continues to hash it, applies the result to the same PUF that was used to create the initial response bitstream for that password, and compares the result to the initial response bitstream. This process continues until the response bitstreams match for all passwords. The number of hashes required to achieve this condition are the components of the session key (or the difference between the first and second predetermined number of hashes for each password). The server then generates the session key by applying the same function to the uncovered number of hashes across all passwords. In one embodiment, this is the product of those numbers.

In another embodiment, a client hashes a plurality of passwords a first predetermined number of times (which may be different for each password), and then combines the hashes using a mathematical operation such as addition, multiplication or XOR. This results in a combined message digest which is sent to a server. The server generates PUF challenges from the message digests, applies the challenges to a PUF, and stores the resulting initial response bitstream. This occurs in a secure environment, and the server deletes, or does not store, the combined message digest.

Later, the client hashes the same passwords a second predetermined number of times (fewer than the first predetermined number of times), and sends the individual hashed passwords as individual message digests to the server. The server then searches for a combination of further hashed message digests that, when combined according to the same mathematical operation originally used by the client, results in a PUF challenge that returns the initially generated response bitstream when applied to the server's PUF.

In another embodiment, a plurality of server devices are required to collaborate to generated session keys. In such embodiments, a client generates, receives or retrieves a plurality of passwords. Each password is subject to a one-way cryptographic function (e.g., a hash) a first predetermined number of times to generate a first message digest for each password. These message digests are combined according a mathematical operation. For example, in one embodiment, they are XORed in series to generate a combined message digest. In a secure enrollment process, over a trusted, secure channel, the client sends, to each server, one of the individual password message digests and the combined message digest. The server holds back an individual message digest for one password, so the method is performed with n hashed passwords, and n-1 servers.

Each server has a first and a second PUF (i.e., an array of addressable PUF devices). Each server is in possession of one individual hashed password message digest and the combined message digest. Each server generates PUF challenges from these message digests, a first set of challenges from the hashed individual password, and a second set of challenges from the combined message digest. The challenges are applied to the first PUF to generate an individual password response bitstream, and the second set of challenges is applied to the second PUF to generate a combined response bitstream. The received message digests are then deleted. Because PUFs are unique, each server will generate a different combined response bitstream starting with the same combined message digest.

Later, to generate session keys, the client hashes each password a second predetermined number of times (which still, may different for each password, but for each password, is fewer times than the first number of hashes). The result is a second message digest for each password. The difference between the first and second number of hashes for the nth password (for which the first message digest was not transmitted) is a client session key. The client then sends to each server a second message digest for the password for which that server received a first message digest i.e., a first server received the first password hashed the first number of times, so it receives the same password hashed the second number of times. Each server also receives the second message digest for the nth password-the hash that was held back during enrollment.

Each server then iteratively hashes the second message digest, applies the result to its first PUF as challenges, and compares the response to the initially stored individual password response bitstream. This process continues until a match is generated, at which point, the server is in possession of the initially created message digest (the message digests generated by the client during enrollment) for its password.

The servers then exchange the initially created message digests, such that all servers have the initially created message digests for all passwords except the nth password. To find that message digest, each server iteratively hashes the second message digest for the nth password, combines the resulting number with the other initially created message digests for the other passwords, applies the result to its second PUF, then compares the resulting PUF response to the initially stored response from the second PUF. This process continues until hash is found that generates a match. The number of hatches to the nth password message digest required to generate a match is the session key. The session key may be used for authentication and encryption. The failure of one server in this process prevents any server from generating an authentic session key.

The above features and advantages of the present invention will be better understood from the following detailed description taken in conjunction with the accompanying drawings.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

Figure 1:
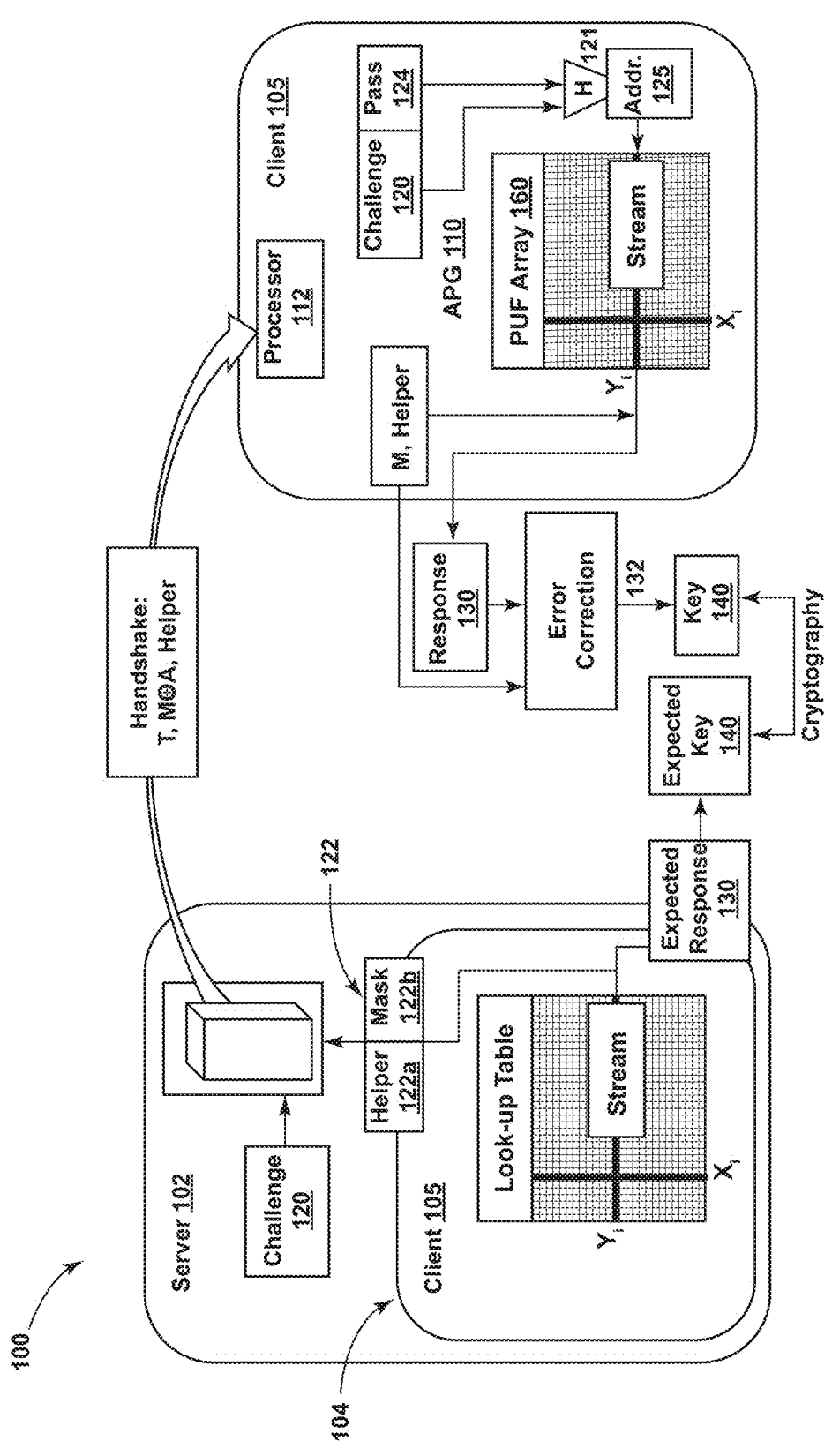
FIG. 1 depicts an exemplary computing environment including an addressable PUF generator (APG) including an array of addressable PUF devices.

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource.

Embodiments of the invention are directed to password management, encryption and authentication systems where passwords, rather than being stored directly, are subject to a one way cryptographic functions and stored as references for authentications. During an enrollment cycle, a client generates a password reference with a one-way cryptographic function and transmits it to server acting as a password manager and authentication authority. During authentication cycles the password manager converts again the passwords with the same one-way cryptographic function, then compares a second message digest containing the password reference with the ones stored in the database. The databases of message digests are much more difficult to attack, and such schemes offer a higher level of protection.

However, password guessing techniques can be effective to attack preliminary hashed stored passwords. Embodiments of the invention enhance the security of such methods by using message digests as inputs to drive PUFs. The message digests are turned into sets of instructions which identify particular portions of a PUF, and optionally, measurement conditions for the individual PUF devices within the particular portions. The identified PUF devices are measured, generating streams of responses. These responses are then stored for future authentication. Without having access to the PUFs, it is more difficult to attack the password manager.

To further protect the users, other embodiments never disclose the passwords and apply pseudo-homomorphic methods to exploit versions of the passwords encrypted using PUFs. The server can compute with various methods the encrypted passwords and perform authentication cycles.

As stated, inventive embodiments use physical unclonable function (PUF) generators (APGs) to, inter alia, generate a password reference, which enables the generation of session keys as set forth below. A message digest created by sequentially hashing a password may be provided to an AGP to generate a response, which may then be stored.

Physical unclonable functions (PUFs) are security primitives that can be used wherever secret or unique random values are needed. A PUF can be described as a digital function f which takes an n-bit challenge C and produces an m-bit response R:

$$f: Bn \rightarrow Bm, \ C \mapsto R$$

where B represents the bits $\{0, 1\}$. The function $f$ is a random function that can only be evaluated with the help of a specific physical system and outputs repeatable responses that are different for each physical system and for each challenge. They exploit the intrinsic randomness of a measurable physical characteristics of the PUF system to do this. An integrated circuit (IC) PUF exploits random manufacturing process variation in a specific structure (e.g., an array) of circuits to produce a fixed response for a given challenge. Exemplary PUF devices usable with embodiments described below include PUF devices of the following types: SRAM cells; ring oscillator circuits; gate delay circuits; resistive memory devices; ferroelectric memory devices; phase change memory devices; magnetic memory devices; flash memory devices; and one-time programmable memory devices. Non-limiting examples of measurable physical characteristics of devices used in PUF arrays are time delays of transistor-based ring oscillators and transistor threshold voltages. Additional examples include data stored in SRAM or information derived from such data. For example, an SRAM PUF exploits the metastability in the start-up process of SRAM cells. In the instant after start-up, the two halves of each SRAM cell circuit both try to pull the output of the memory cell to either a "1" or "0" state. Depending on the specific process variation of the transistors in the circuit, one half of the SRAM cell will be unpredictably stronger and will force the SRAM cell into the corresponding state. The behavior of the structure of SRAM cells must then be combined in some way by a control system or architecture to provide the challenge/response mechanism and provide the PUF interface. In the example of an SRAM-based PUF device, the device could be power-cycled 100 times and the frequency of the "0" or "1" state could be used as a characteristic of that device. Other non-limiting examples of suitable characteristics include optical measurements. For instance, a PUF device may be an optical PUF device which, when illuminated by a light source such as a laser, produces a unique image. This image may be digitized, and the pixels may be used as an addressable PUF array. A good PUF should be predictable, and subsequent responses to the same challenge should be similar to each other (and preferably identical).

Hardware based PUFs, are a somewhat newer technology that hopes to find a way to fingerprint a device uniquely to allow for device authentication or to hold unique data to provide encryption keys or key material. When utilized as a PUF, the efficient use of the memristor is used in a similar crossbar array as ReRAM. While a memristor has many possible states of resistance, states are typically grouped into two groups, High Resistance State (HRS) and Low Resistance State (LRS). This binary group transitions well to bit-wise operations. Another consideration in utilizing a PUF is its reliability over temperature, electromagnetic interference, and aging. This practice typically utilizes helper data which, in essence, filters a PUFs response to return consistent results. While it can be easy to create a consistent result with extreme filtering and correction, it is advantageous that the helper data keeps the overall entropy of the PUF intact. It is also important that the helper data, if used, does not give information away about the PUF or allow an attacker a reduced search space for modeling or brute force key recovery.

PUFs have been proposed for use in many applications such as IC identification, hardware metering, challenge-based IC authentication and secret key generation, IP protection in FPGAs and remote service and feature activation. Generally, the distinction between identification and authentication is that identification is not cryptographically strong. Hardware metering is the process of tracking each IC that has been manufactured and allowing features to be remotely activated. Typically, the literature on authentication is concerned with the generation of symmetric keys, but asymmetric keys can also be generated by a PUF system.

It is helpful to discuss examples of the use of PUFs in the authentication and encryption contexts as these examples illustrate elements of computing environments in which the password management methods set forth below may be implemented. Generally, these authentication and encryption methods (e.g., PKI) involve a first device with an addressable array of PUF devices. Such a device may be a "client" device, which may include non-volatile storage, a programmable processor and circuitry necessary to measure a physical characteristic of or otherwise apply stimulus to PUF devices in the array and measure the response of those devices. This driving and reading circuitry and the PUF array itself may be referred to herein as an APG. In the context of this disclosure, a challenge is any information transmitted to an APG to cause production of an expected response (referred to as a "challenge response") corresponding to that information. Thus a "challenge" is specified measurement or stimulus provided to the PUF array, or to identified individual PUF devices therein. Challenge responses may be generated by accessing devices (or ranges of devices) in an array of PUF devices belonging to the APG and/or by measuring physical characteristics associated with those devices. Along these lines, a challenge may be input supplied to an APG which is used to produce a response having one or more expected values which depend upon characteristics of the PUF array belonging to the APG to which the challenge is issued. The appropriate challenge response may be derived from those characteristics using instructions stored by the APG or other processing circuitry, received by the APG or other processing circuitry and/or additional information supplied to the APG or other processing circuitry (such as a password of a user). In one simple non-limiting example, a challenge might simply be returning the values stored by devices of a PUF array (e.g., an SRAM array after initial power-up) at a specified address or range of addresses. In other non-limiting examples, a challenge might include instructions to perform a mathematical, logical, or other operation(s) on those values.

An exemplary protocol for device authentication will now be discussed, again, to illustrate a computing environment in which the methods set forth may be practiced. An example PUF-enabled authentication protocol includes the following stages: (1) Enrollment, (2) Handshaking, and (3) Authentication/Encryption Key generation. These stages are described below, beginning with reference to FIG. 1 illustrating an example environment 100 in which embodiments disclosed herein may be practiced. The environment 100 includes a server 102 and one or more client devices 105. The server 102 manages a database 104 which may be stored in memory of the server 102. The database 104 stores a set of initial challenge responses, which may be generated in response to challenges issued by the server 102 to the client 105, each of which may respond to the challenges by accessing a respective PUF array 160. Alternatively, the server 102 may be otherwise provided with information suitable to generate the initial challenge responses 130.

The client 105 has an addressable PUF generator 110. The PUF array 160 may form part of the APG 110 as described further below. The APG 110 may contain additional processing circuitry and execute instructions for generating challenge responses. Enrollment is performed for each client 105 in a secure environment. After enrollment, a constellation of clients 105 may operate in an insecure environment and communicate with each other over public networks. Secure information should be encrypted. The PUF array 160 of a client 105 is an array of electronic or other devices with measurable physical characteristics, configured in an addressable array similar to an addressable memory device such as RAM or ROM chip. Due to small variations which occur during semiconductor manufacturing or other manufacturing processes, each PUF device (and hence each PUF array 160) may be unique, even if the PUF arrays are mass-produced by a process designed to produce nominally identical devices. The PUF array 160 (shown as a 2D-array of cells) of a client 105 may be accessed by the client 105 which receives challenges 120 (originating in this example from the server 102). The APG 110 responds by to challenges 120 by generating responses 130 using measured characteristics of one or more PUF devices within the PUF array 160 identified by the challenge 120 or derived from it using instructions stored by the APG 110.

Each client 105 has an APG 110 containing a PUF array 160 that is unique to that client 105. The APG 110 of a client 105 may be used to generate numerous responses 130 (i.e., responses unique to that client 105). These responses 130 cannot be replicated by an attacker without physical access to the PUF array 160. During the Enrollment stage, the server 102 may obtain the initial responses 130 for each client 105 by generating all possible challenges 120 and storing responses 130 to those challenges 120 generated by each APG 110 in a database 104. Alternatively, the server 102 may be otherwise supplied with characteristics of each PUF array 160 sufficient to generate the expected responses 130. The processor 112 may include instructions to combine information from the challenge 120 with additional information (such as a user password 124) and pass the combination through a hash function 121 the result to produce the address 125 (or range of addresses) within the PUF array 160 in order to generate the proper response 130.

After the clients 105 are enrolled with the server 102, embodiments disclosed herein may be utilized to authenticate the client 105 and produce an encryption key which the server 102 and client 105 may use to communicate securely. First, the server 102 and a client 105 enter the Handshaking stage. In the Handshaking stage an objective is for the server 102 to transmit the information needed to identify a particular portion of the PUF array 160 of the client 105. Both the server 102 and the client 105 can independently produce a response to the challenge: the server can lookup information about the PUF array 160 obtained during enrollment (or otherwise supplied to the server 102) and the client 105 can retrieve the same information by using the APG 110 to access the PUF array 160.

During Handshaking, the server 102 issues a challenge 120 to the APG 110 of the client 105. This challenge 120 is used by the APG 110 to identify the portion of the devices belonging to the PUF array 160 to access. This challenge 120 may be a random number. In some embodiments such as embodiment 100, the server 102 and the client 105 may have access to the same random number generator or may have synchronized random number generators. In such embodiments, the server 102 does not need to transmit the challenge 120 to the client 105 in order for the client 105 to generate the challenge response 130 using the APG 110.

In embodiment 100 and similar embodiments the ability of the client 105 to generate the challenge response 130 may be protected by a password 124. In such embodiments, the address 125 specifying which device(s) in the PUF array 160 to access may be produced by combining the challenge 120 with the password 124. As a non-limiting example, the client 105 may input the password and the challenge into a hashing function to produce the address in the PUF array 160. As an example, if the PUF array 160 is represented as a two-dimensional array containing 256 rows and 256 columns, 8 bits of the message digest can be used to find the first coordinate X in the PUF array 160; the following 8 bits can be used to find the second coordinate Y.

As discussed above, the measurement of characteristics of individual PUF devices may not be perfectly deterministic. As part of the Handshaking process, the server 102 may send additional information 122 to the client 105 for use in making generation of the challenge response 130 more reliable. The additional information 122 may include error correction instructions (ECC) 122a (sometimes called a "helper" or "helper instructions") and/or masking instructions 122b. The error correction instructions 122a may include a checksum or other error-correcting information for use with error-correcting codes, or other information or instructions used in response generation schemes to be discussed later below. The masking instructions 122b instruct the APG 110 to exclude cells which the server 102 characterized as unreliable cells during Enrollment. The APG 110 may generate corrected responses 132 which simply exclude measurements of the unreliable cells. Alternatively, the processor 112 may measure additional cells to ensure that the corrected challenge responses 132 are of a specified length. The processor 112 may store instructions for selecting the additional cells to measure or may receive such instructions as part of the additional information 122.

Upon receiving the challenge response 130, the APG 110 may use the additional information 122 to generate corrected responses 132. Use of the additional information 122 and other methods of improving the reliability of the APG 110 will be discussed further below. The corrected responses 132 may be used directly as encryption keys 140 or may otherwise be used to derive the encryption keys 140. The server 102 may similarly independently produce the encryption keys 140 using the initial responses 130 stored in the database 104. The server 102 and the client 105 may then communicate securely by encrypting messages using the shared encryption keys 140 or encryption keys derived from them (e.g., public keys corresponding to the keys 140 according to an asymmetric cryptographic scheme).

The server 102 can authenticate a client 105 by issuing the challenge 120 to the client 105 and then comparing the corrected challenge response 132 generated by APG 110 with the initial response to that challenge stored by the server 102 for that client 105 (e.g., initial challenge responses 130) or determine that the corrected challenge response 232 is consistent with the initial challenge response

130 by comparing information derived from the corrected challenge responses 132 with information derived similarly by the server 102 from one of the initial challenge responses 130 corresponding to the challenge 120 issued by the server. The server 102 may require that the corrected response 132 is identical to the expected response to the challenge 120 (i.e., the initial response 130 corresponding to the challenge 120) in order to authenticate the client 105. Alternatively, the server 102 may accept a corrected response 132 with a Hamming distance (or a value of another distance metric) less than a predetermined maximum value from the expected response as evidence that the challenge response 130 is consistent with the expected response. For example, the server 102 may infer that the client 105 has generated a response which differs by less than a predetermined maximum number of symbols from the initial response 130 and determine that the challenge response 130 is consistent with the initial response 130 (i.e., was generated by a client 105 in possession of the same PUF array used to obtain the initial response 130). When the CRP error rates are relatively low, the responses can be used as part of authentication protocols. In such cases, Hamming distances between responses and the expected responses as large as 10% of the total response length may still be used to provide acceptable false-accept and false-reject rates (FRR and FAR). When the CRP error rates are too high, the use of error-correcting methods may be used to improve both FAR and FRR.

The authentication and encryption arrangement and methods explained above are provided as context for the embodiments and methods described below. The person having ordinary skill will appreciate that in the arrangement of FIG. 1, the client device and the server device each are computing devices having programmable processors and preferably non-volatile storage. While in the arrangement described above, the client device has the APG and the PUF and the server has an image of the PUF (storing previous responses generated during enrollment), but the reverse arrangement is also possible. Additional, either or both of the client and server should be understood to have the conventional features of computing devices-input/output devices, network adapters supporting networked communication, and the like. Random number generators, or pseudo-random number generators, as ASICs or preferably as processes running on the device's processor, may also be useful are may be included in certain embodiments.

Figure 2:
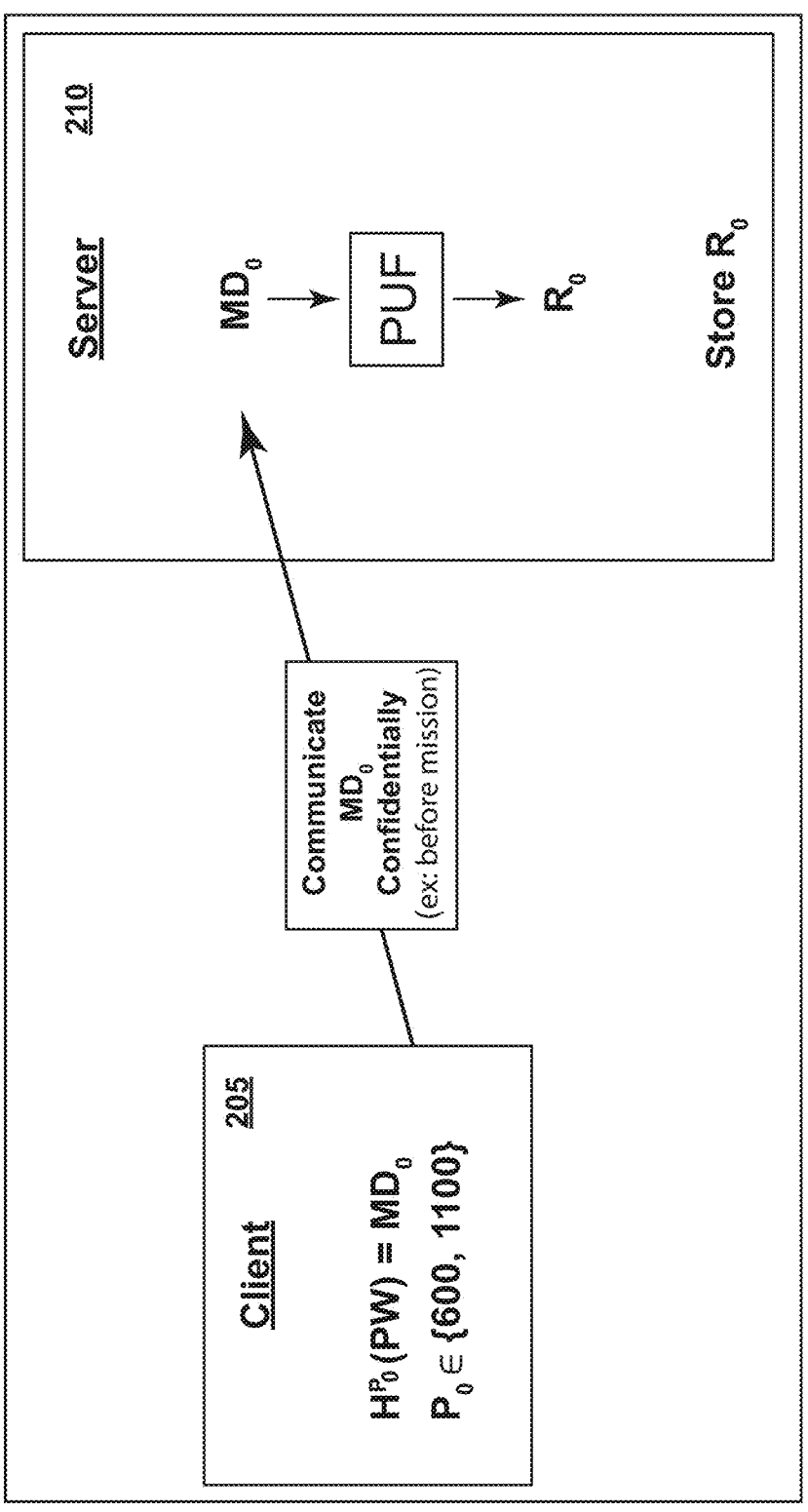
FIG. 2 is a conceptual block diagram depicting the enrollment of a password by a client device with a server having an APG acting as a password management authority.

Turning now to FIG. 2, there is shown an arrangement between a client 205 and a server 210 for enrolling the client device enabling future generation of session keys. It will be understood that a session key is an authentication token or encryption key that is assumed to be valid only for a limited period of time. In the arrangement of FIG. 2, client device 205 and server 210 are computing devices, each including programmable processors executing computer readable instructions stored in non-volatile memory which encode the method and process steps hereinafter described. The memory may be local, or may be in secure electronic communication with the devices. The devices may also have conventional elements of computing devices such as input/output interfaces and devices and network interfaces. In the embodiment of FIG. 2, server device 210 includes an APG and its addressable array of PUF devices. Both devices may also have access to a random number generator or pseudo-random number generator, which may be a process running on the subject machine's processor.

While many of the embodiments below, including the embodiment of FIG. 2 are described in connection with a single client it should be understood that multiple clients may use the methods described herein in connection with one or more servers acting as password managers and authentication authorities.

In an exemplary enrollment process, one or more client devices 205 initiate the process by receiving a password, i.e., from a user using a client input/output device. In alternative embodiments, client 205 receives a previously entered password from memory. In alternative embodiments, client 205 perturbs an entered or previously stored password, e.g., by xoring the password with a random number, to create a new password. Client 205 applies a one-way cryptographic function to the password. In a preferred embodiment, the one-way cryptographic function is a cryptographic hash taking the password, which may be an arbitrary length, and mapping it to a fixed length output. The invention is not limited in terms of the hashing method or algorithm usable therewith, and multiple hashing methods are deemed suitable for use with inventive embodiments depending on the system's requirements for the length of the message digest. Exemplary acceptable hashing algorithms include MD4, MD5, the SHA algorithms, DSA, Whirlpool, RIPEMD and BLAKE. Client 205 hashes the password a first predetermined number of times, $P_0$, resulting in a message digest $MD_0$, which is transmitted to the server 210. In certain embodiments this enrollment procedure occurs in a secure environment. In FIG. 2, the exponential notation $H^{P0}$ is used to describe such a multiple hashing operation, such that the message digest $MD_0 = H^{P0}(PW)$. It is advantageous that the natural number $P_0$ be picked randomly. In certain embodiment's the client 205 includes a RNG, which generates $P_0$. which preferably is a relatively large number (e.g., between 600 and 1,100).

The server 210 includes an addressable array of PUF devices and an APG, which measures some physical characteristic of the individual PUF devices and outputs the resulting measurements, that is to say that the APG can provide challenges to the PUF array and return responses. The server uses $MD_0$ to drive its PUF and APG to generate the data stream of responses $R_0$. That is to say, the server derives a set of PUF challenges from $MD_0$, applies those challenges to its PUF, and obtains the corresponding responses. In some embodiments, server 210 may convert $MD_0$ into a range of addresses or indices corresponding to individual devices in the server's PUF array to measure. The resulting bitstream of responses $R_0$ is stored by the server for future reference. Typically, a client device takes 10 μs to hash a message, and the latency to hash PW one thousand times is in the 10 ms range. The Server needs about 10 ms to generate a 256-bit long data stream of responses from its PUF, thereby the enrollment cycles are extremely short.

In alternative embodiments, a non-illustrated third party device, acting as a certificate authority (CA) is provided. The CA includes an image of one or more client PUFs. As is set forth above, a PUF image is a database of previously measurement responses for a plurality of the individual devices in the PUF array, ideally, all the devices, although some erratic devices may be ignored. In certain embodiments, a CA computing device includes an image of the PUF array on the server. The client device 205 secretly (i.e., over a trusted communication channel) sends the message digest, $MD_0$ to the CA, which computes (or looks up) $R_0$ from its PUF image. The CA may then pass $R_0$ to the server, while $MD_0$ remains secret. In such embodiments, the computational burden of the enrollment process is transferred from the server 210 to the CA. Additionally, this arrangement offers additional security because $MD_0$ is not transmitted in the clear, and the server 210 does not measure or query its PUF during enrollment, which increases the resistance of the server to side channel attacks directed at detecting the PUF's response. This may be advantageous when the server is exposed to a highly hostile environment.

In yet another embodiment, client 205 generates a plurality (preferably on the order of 1000) message digests $MD_0$. These may be generated by permuting one or more user supplied passwords with the help of random numbers generated by the RNG. By way of example, a single password could be XORed with a plurality of ~1000 sequentially generated random numbers, resulting in a plurality of permuted passwords. Each permuted password is then iteratively hashed a random number ($P_0$) times. Additionally, or alternatively, a series of passwords or permuted passwords is iteratively hashed a different number of times (i.e., $P_0$ is different for each password or permuted password). In either case, the resulting hashed passwords or permuted passwords are sent as message digests to the server (or to a CA as above). The server, or the CA, generates the corresponding $R_0$s and store them in a data base. These embodiments increase security because the client devices can constantly change their passwords, and this at a relatively small cost of increased complexity. In extreme cases, a password can be only used once to create a single session key.

The password generation and hashing processes described above may apply to any of the methods described below. Moreover, the enrollment process described above in reference to FIG. 2, as well as those described below in reference to FIGS. 5, 7 and 9 preferably occur in a secure environment, before the server is placed into secure environment. During these enrollment processes, the server deletes or does not store the initially received message digests, and only stores the corresponding PUF response(s). For example, referring to FIG. 2, after the server 210 has generated the response $R_0$ by driving its PUF with the message digest $MD_0$, the server deletes or does not store the message digest $MD_0$.

Figure 3:
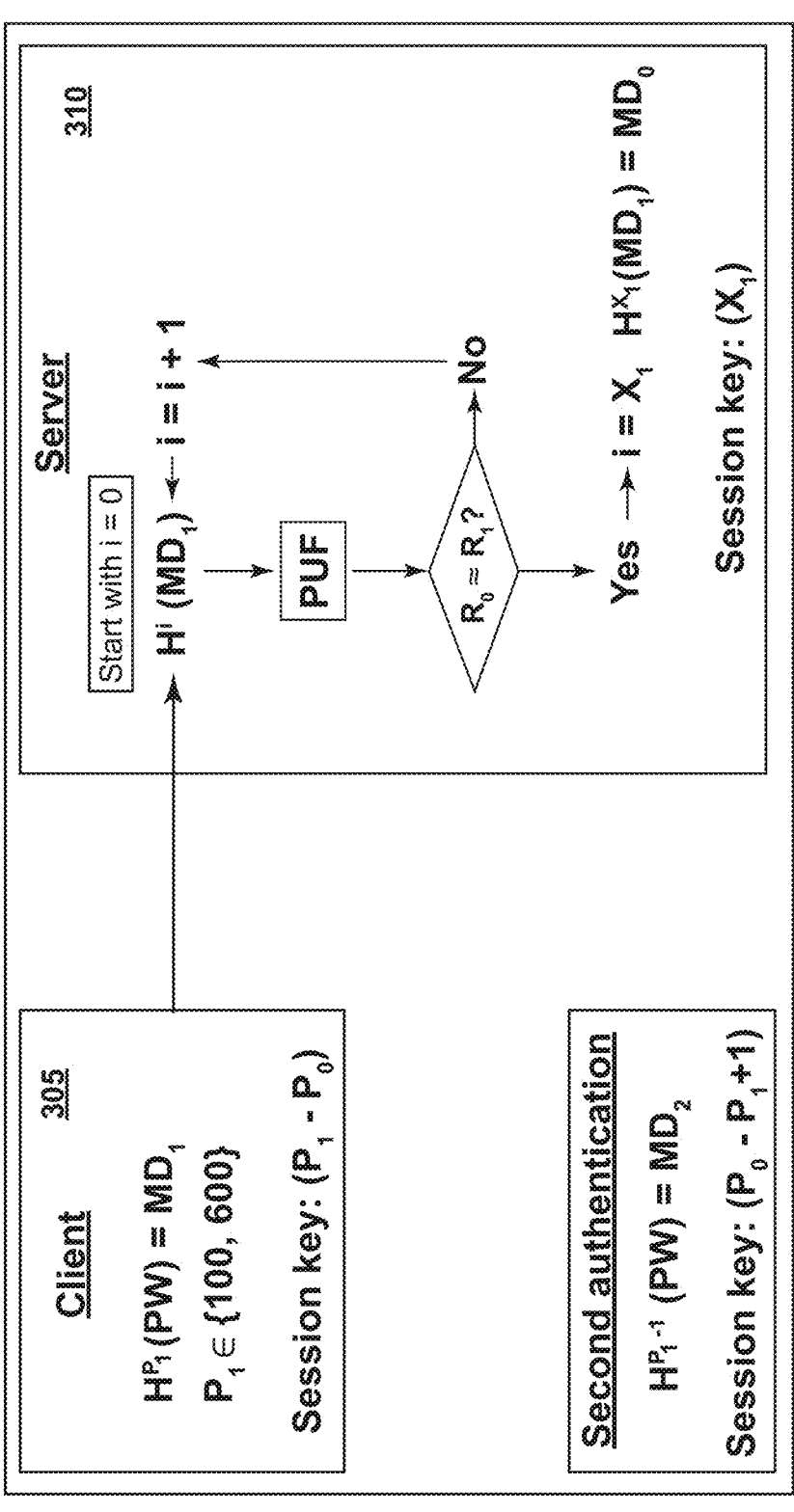
FIG. 3 depicts the generation of a session key at client and server devices after the enrollment process illustrated in FIG. 2 is performed.

Referring now to FIG. 3, a method of generating session keys for communication between a client and a server that have engaged in one of the enrollment processes discussed immediately above will now be described. To generate a client session key, the client 305 again receives a password, either from storage, or preferably from a user of the client device. The client then hashes the password a second predetermined number of times $P_1$ times to compute a message digest $MD_1 = H^{P1}(PW)$. This message digest is sent to the server. The natural number $P_1$ may be picked randomly, such as with the client's random number generator. Preferably the second predetermined number, $P_1$ is considerably smaller than $P_0$ (e.g., in a range of 100 and 600 where $P_0$ is 1000). Preferably, the second predetermined number $P_1$ is in range of between 5 and 80% of the first predetermined number $P_0$. In certain embodiments, $P_1$ is at least 100. The server 310 uses $MD_1$ and its APG to find the natural number $x_1$ through an iterative process, generating the data stream of response $R_{P1}$ from the message digest $H^{X1}(PW)$ that is approximately equal to the initial data stream $R_0$ which was kept as reference. That is to say, client 310, using the same hashing algorithm as employed by the client 305, continues to iteratively hash the message digest, and apply the resulting hash (e.g., has a set of PUF addresses) to its PUF, until it gets a PUF response that is equal to the initially stored response $R_0$. The number of times the server must hash the message digest, $X_1$, is the session key, which may be used to authenticate the server, or to generate encryption keys to support further communication between the devices. The client may also calculate this number $X_1$, which is the difference between $P_0$ and $P_1$.

It will be appreciated that PUF responses of the server during the key generation step mentioned immediately prior may not match the initially generated responses. That is to say, even in cases where the server has hashed the message digest a sufficient number of times to arrive again at the initial message digest $MD_0$ that was received during enrollment, applying that message digest to the PUF may not return the same initially measured $R_0$. This is because hardware PUFs of the sort contemplated for use in preferred embodiments described herein are not perfectly deterministic. PUF devices are subject to drift, and may return different measurement values depending on changing factors such as temperature. Additionally, certain PUF devices may be erratic. For example, in the case of SRAM PUFs, certain cells may settle to a 1 state and a 0 state about half the time with repeated power-on cycles. Several strategies may be employed to deal with this issue. For example, systems operating according to inventive embodiment can characterize the server PUF before hand and exclude the addresses of erratic cells from being included (or generated by) any message digest applied to a PUF according to the methods described herein. Moreover, the methods described herein do not not require an absolute match between the matching stream $R_{P1}$ and the initial stream $R_0$ as long as false acceptance rates can be ruled out. For example, a matching of 90% of the streams $R_{P1}$ and $R_0$, are perfectly acceptable, thereby tolerating drifts in the physical properties of the PUF. In certain embodiments, a bit match rate of greater than 70% is acceptable. In other embodiments, bit match rates of greater than 75, 80, 85, 90 and 95% are preferred.

Thus, in certain embodiments, the server compares $R_{P1}$ and $R_0$ and if they have a degree of match that exceeds some matching threshold, the server assumes it has hashed the message digest the correct number of times. A time-out threshold may be applied to this process, where if the server does not find a match within a predetermined number of hashing iterations greater than $P_0$, the process times out. In these circumstances, the server can determine that the client is not authentic and refuse all communication. Alternatively, the client device may be prompted to send message digests corresponding to another pre-enrolled password (or the user of the client of device may be prompted for another password that has previously been enrolled), and the process begins again. Alternatively, the client may renew its password, as described below, to re-start the process.

It will be noted that the latencies of the protocol described above are rather small. Assuming a worst-case configuration, in which the server needs 10 ms to generate a 256-bit long data stream of responses, this search takes about 10 s, while the client device still operates in ms.

As noted above, as a result of this process, the client and server share a piece of information, $x_1$, which is the shared session key generated by the protocol (i.e., $x_1=P_0-P_1$) Alternatively, the shared session key may be computed from $x_1$. For example, $x_1$ may be hashed by both devices a predetermined number of times to generate a key pair, $x_1$ may be used as the input seed to a cryptographic keying algorithm, $x_1$ may be expanded by sequentially XORing its bits or applying it as an input to an extended output (XOF) function, or may be combined with a random number, as described below. Combinations of these techniques may be used, for example, hashing or combining $x_1$ to achieve a word of the correct length, and then applying the word to a keying algorithm, as described below. Additionally, other techniques may be applied to increase the length of the session key, which will be described below.

As is shown on the bottom-left of FIG. 3, the client device can renew the session key by hashing one less time its password PW. That is to say, the client can renew the key by sending a new message digest that is the password that has been hashed $X_1-1$ times, where the renewed session key will be $X_1-1$. The server can then find this new session keys according to the methods described above, by iteratively hashing the newly received hashed password and applying the result to its PUF until it arrives at a hash that results in $R_0$. Hashing a password is a one-way cryptographic function; the server recognizes that $H^{P1-1}(PW)$ can only be generated by the client device.

It will be recognized that by decrementing the number of hashes to renew the session key, the client does not need to send any additional information to the server to enable the server to recover the same key. Moreover, the client can decrement the number of hashes for the renewed key by any arbitrary amount (above some threshold set by the desired key length), and the server can still find the key. When the smallest value of $P_1$ is 100, the client can renew the session key step-by-step one hundred times. Both parties can agree upfront upon methods to independently generate new session keys from $x_1$.

It will be appreciated that the session keys cannot be generated by the server without having access to the PUF used during enrollment of the password, or at least, an image of the PUF. Combined with certain cryptographic protocols, this can become a feature to authenticate the server, block malicious servers, and give the opportunity to the server to self-destroy its PUF during certain attacks. For example, the server may provide the client with a hash of its session key, which the client may then compare with a hash of its own session key, and if the hashes match, the server is authenticated. If the hashes do not match, the client may refuse communication with the server. The server may also encrypt its session key with a symmetrical key also held by the client, or one half of an asymmetrical key pair, the other half of which is held by the client. The client can then decrypt the encrypted key and compare the result with its own key. In cases where the client has authenticated the server, it may accept communication with the server. The client may also accept software downloads from the server. In cases where the client is not able to authenticate the server, in addition to refusing communication, it may pass a message to the server prompting the server to destroy its PUF, refuse communication with any other client device, or take any other suitable action.

Figure 4:
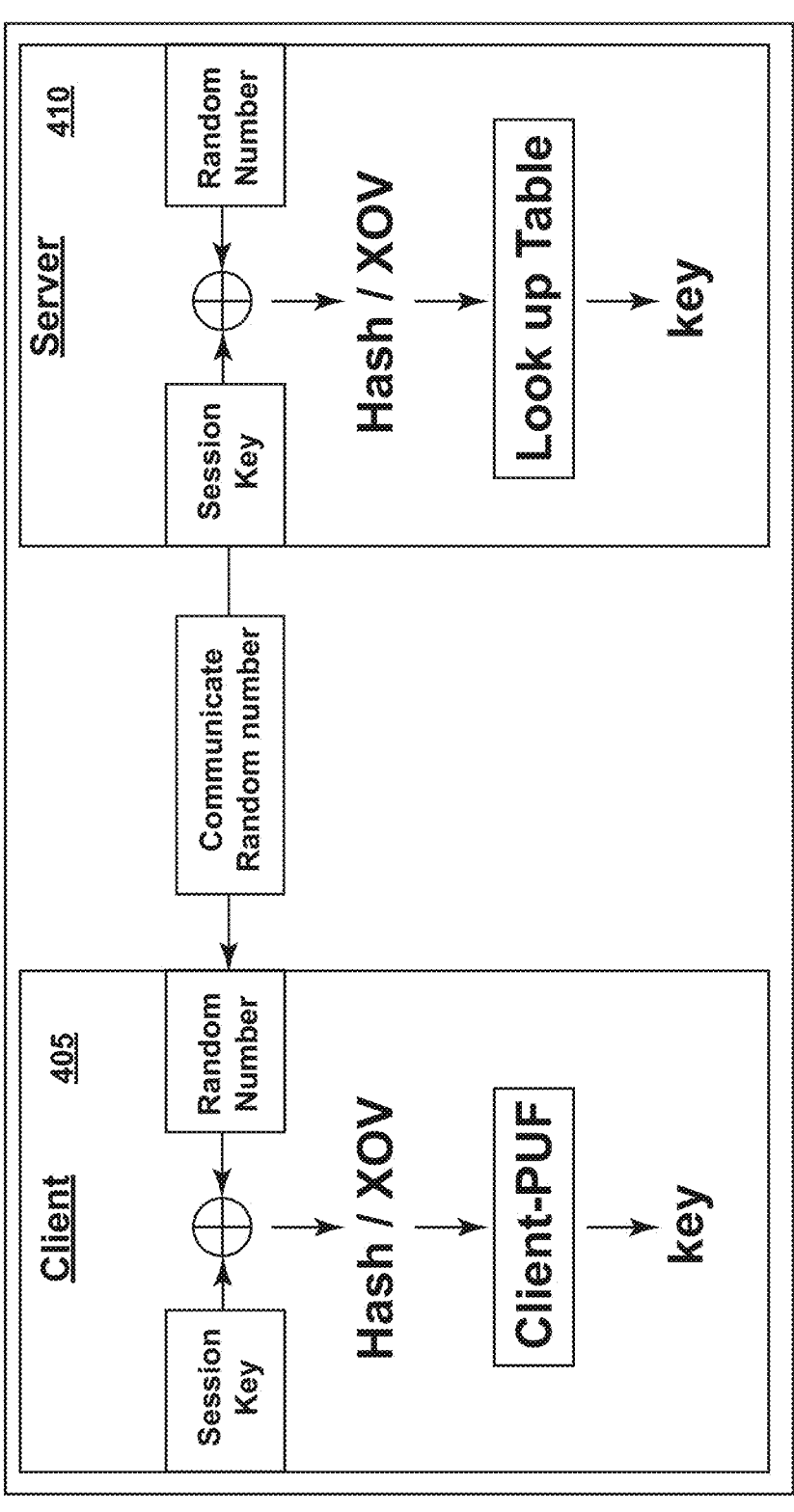
FIG. 4 depicts an arrangement for the use of session keys by a client having an APG and a server having a corresponding image of the client's PUF.

Another example of a server-authentication protocol is shown in FIG. 4. In this case, in addition to the server including a PUF for session key generation, as in FIGS. 2-3, the server has an image of a PUF that is in the possession of a client device. Thus the method immediately below may be implemented on an arrangement that is a combination of the arrangements of FIGS. 1 and 2-3, where each client device 405 has its own PUF and the server 410 has access to a look-up table containing images of the client's PUF, as well as its own PUF for recovering the session key.

To generate a cryptographic key with the recovered session key, the server uses the session key to generate a series of PUF challenges. The challenges may be addresses of PUF devices in the client's PUF array. Using these addresses (the challenge bitstream), the server retrieves previously measured responses from the client's PUF from the server PUF image. This response bitstream is then used as, or as a seed for generating, a cryptographic key. The client, which also has the session key, uses its copy of the session key to generate the same challenges (i.e., addresses for PUF devices in its PUF). The client then measures the identified addresses, and uses the resulting responses as or as a seed for generating, a matching cryptographic key.

Variations on this general process are possible, one of which is shown in FIG. 4. According to that method, to generate a new cryptographic key, the server 410 combines (e.g., via XORing) a freshly generated random number generated with its RNG with the session key and hashes the resulting stream to generate an instruction set. The new instruction set is converted into or interpreted as a PUF challenge, e.g., the instruction set may be parsed into the addresses or other identifying information for individual PUF devices to measure (or to look up the previous responses therefore in the PUF image stored on the server). The instruction set is used by the server 410 to look up, in the PUF image data, the previously measured responses of the PUF devices identified by the instruction set. An encryption key is then generated from the resulting response bitstream, using any cryptographic keying algorithm. The client device follows independently the same process, using the same session key to generate from the actual physical PUF the same new encryption key. This requires that the client device 405 have access to the same random number, which it may receive from the server, as shown, or which it may independently generate with a time synchronized random number generator.

In alternative embodiments, rather than generating symmetrical keys, each device can use the seed including the session key and the shared random number to generate public-private key pairs for asymmetrical key communication methods, such as PKI.

In certain embodiments, it is preferrable for the server device to delete its session key after key generation, to prevent it from being compromised in the event that the server is in a hostile environment. Optionally, the client device may also delete its session key after key generation.

In the method just described, it is clearly advantageous for the client's PUF to generate the same responses as those stored in the server's image. Indeed, when PUF responses and previously stored responses are being used to generate encryption keys, as here, obtaining a match between the responses is very important. Even a single-bit error in an encryption key may produce a ciphertext which cannot be correctly decrypted. Several solutions to this problem have been suggested as ways to ensure that matching response bitstreams (and therefore, matching keys) are generated at both client and server. For example, the use of error correction instructions (e.g., the error correction instructions 122a shown in FIG. 1) can reduce error rates. Additionally, ternary PUF schemes may include characterizing each PUF device in a PUF array (e.g., a PUF array 160). During Enrollment, the server issues each possible challenge repeatedly and tracks the statistical distribution of values included in the challenge responses. The server then assigns the elements of each challenge response corresponding to individual PUF devices to one of three ternary states, which will be referred to using the ternary digits {−, x, +}. Measured device characteristics which fall within a first range of values are assigned the ternary value '−'. Measured device characteristics which fall within a second range of values exclusive of the first range are assigned the ternary value '+'. Measured device characteristics which fall within a third range of values exclusive of the first range and the second range are assigned the ternary value 'x'.

For example, if the PUF devices are SRAM cells, the measured device characteristics may be the frequency of the binary data states stored by the SRAM cells after power cycling. Cells which are always (or almost always) in the '0' state may be assigned to the '−' ternary state, while cells which always in the '1' state may be assigned to the '+' ternary state. Meanwhile, cells which are "unreliable" fluctuate between the '0' and '1' state may be assigned to the 'x' ternary state. The resulting ternary representations may be stored by the server and the client, and the addresses corresponding to erratic devices can be excluded from any instruction set being used to measure the client's PUF or to look-up responses in the server's PUF image.

Other solutions to address the problem of mismatch between response bitstreams and retrieved bitstreams have been suggested. These solutions involve "response-based cryptography" (RBC), and are disclosed, generally, at U.S. patent application Ser. No. 16/683,943 and Ser. No. 16/598, 985, which are incorporated herein by reference in their entirety. Under a version of RBC, a server, possession of a PUF image, searches for a set of PUF responses that match the PUF responses measured by the client in response to the challenge. This search may involve retrieving a set of expected responses from the server database, generating a cryptographic key, receiving a cryptographic key from the client (generated with the measured responses) and comparing the keys. If the keys do not match, the server than generates permutations of the expected PUF responses and generates new keys from the permutations.

Any or all of the error correction methods described above are usable in conjunction with the methods described herein, alone, or in combination.

Returning to; to FIG. 4, once the devices generate matching PUF response bitstreams, they may use those response bitstreams to generate symmetrical encryption keys, or to generate public-private key pairs for asymmetrical encryption. New keys may be generated on demand with new random numbers. Valid session keys are needed in this method to generate new keys, which prevents players without session key from participating. In certain embodiments, the session keys can also be used by the server to download any software update, or new features, preventing malicious servers to take an automatic control of the server.

Use of session keys generated in the manner above have certain advantageous that serve to protect client devices from malicious servers in zero-trust environments. The aforementioned methods provide the following layers of security.

1) The client device need not disclose its passwords. The combination of multiple hashing operations, and the PUF allows the server to authenticate the client device and to generate the session key. Such pseudo-homomorphic computations also allow the client to authenticate the server.

2) The server does not have to store the session key after completion of the cryptographic protocol, therefore reducing its exposure to a limited period of time. For higher security, the client device can enroll multiple passwords, and the Server can store multiple data streams of responses. In such a case, the session keys may be used only once.

3) The security of the scheme is enhanced by high quality PUFs. Reliable, strong, and tamper resistant PUFs are desirable.

4) As suggested in the previous section, a certificate authority (CA) can further reduce the exposure of the server when exposed to a highly hostile environment. In these embodiments, the sensitive information, $MD_0$, is never disclosed to the server. The opponent cannot find the session key from $R_0$ without having access to the PUF.

5) The session keys in this protocol are rather small. Ways to increase their length are presented in the following sections of this disclosure with schemes largely similar to the one presented above in this section.

Figure 5:
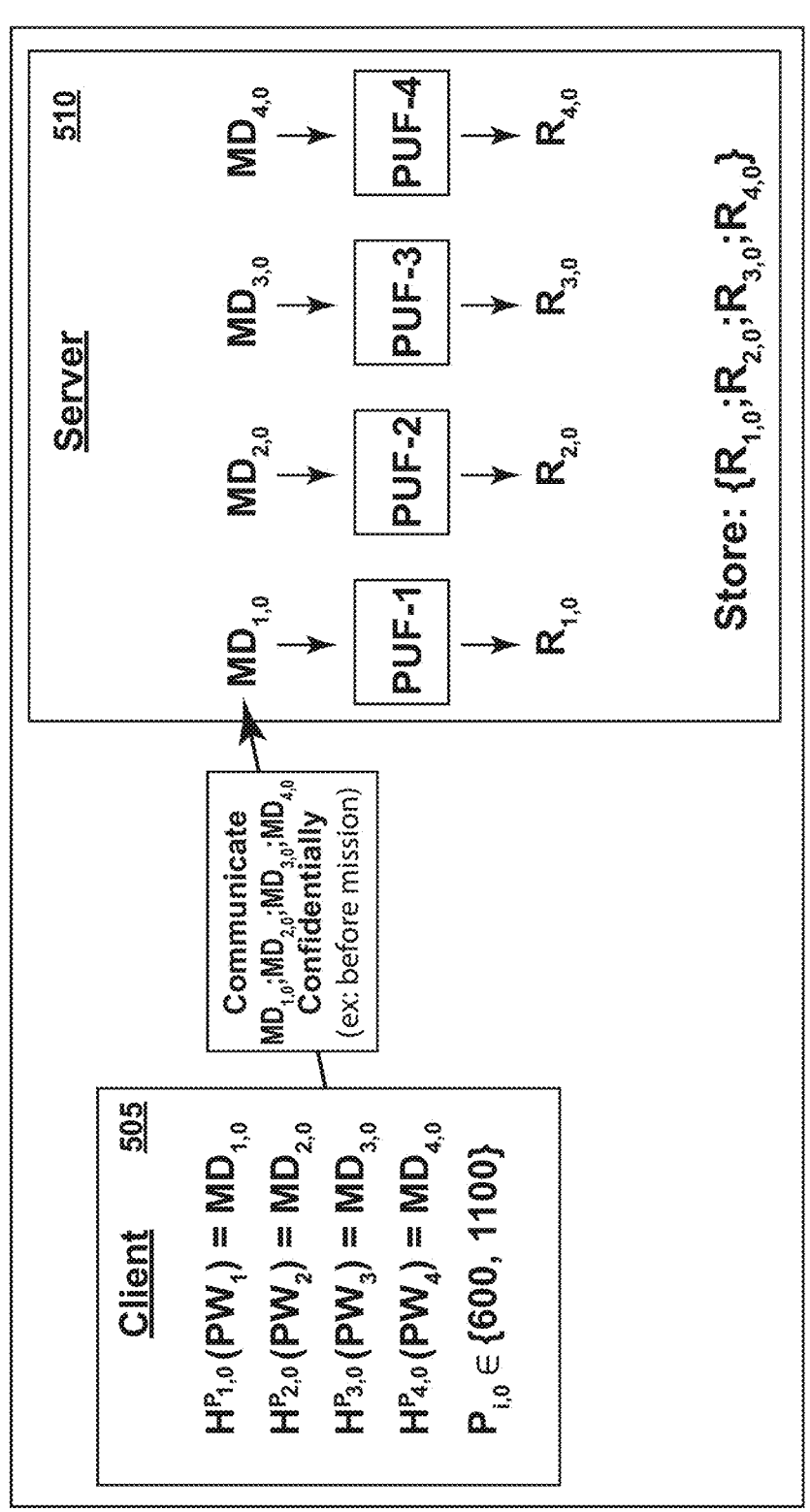
FIG. 5 depicts an exemplary enrollment process for a plurality of passwords by the client device.

Referring now to FIG. 5, there is illustrated an arrangement in which the server is equipped with several, concurrently addressable PUF AGPs arranged such that multiple response streams can be generated from several instruction sets driven by multiple message digests. The throughput in term of response generation per second is proportional to the number of available PUFs.

In the arrangement of FIG. 5, each client device (e.g., 505), hashes multiple passwords multiple times and communicates confidentially the resulting streams (MD$_{1,0}$, MD$_{2,0}$, etc.) to the server. This process is similar to the process set forth above with respect to FIG. 2. The user may be prompted for the passwords, and may enter the passwords via an input output device at the client, or they may be retrieved from memory. The client iteratively hashes (i.e., hashes the password, then hashes the resulting hash, etc.) each password PW$_i$ (the password "i") Pi,0 times to get the message digest MD$_{i,0}$=HP$_{i,0}$(PW$_i$). The sets of natural numbers P$_{i,0}$ are picked randomly (with the assistance of a client RNG), and are preferably considerably large. In one embodiment, the first predetermined number reflecting the number of hashes is in the range of between 500 and 2000. In another embodiment it is between 600 and 1100. As is described above in connection with FIGS. 2-3, the server 510 receives the message digests, and uses the set of message digests MD$_{i,0}$ to generate concurrently, from the set PUFs, multiple data streams of responses Ri,0 that are stored by the server for future reference. The server only needs about 10 ms to generate multiple 256-bit long data streams of responses concurrently, using the parallel PUFs, therefore the enrollment cycle stays approximately as short as the one presented previously. As above, this enrollment cycle occurs in a secure environment, and the server does not store the received message digests MD$_{i,0}$.

Session keys are generated in a manner similar to that described above in connection with FIG. 3. The client again iteratively hashes each password "i" P$_{i,1}$ times to get the message digest MD$_{i,1}$=HP$^{i,1}$(PW$_i$). The second predetermined number of hashes P$_{i,1}$ is chosen randomly, with assistance from the client's RNG, but it is advantageous for the second number of hashes to be considerably smaller than the first number of hashes done during the enrollment process described with respect to FIG. 5 (e.g., in a range of 100 and 600 where P$_{i,0}$ is 1000). Preferably, the second predetermined number P$_{i,1}$ is in range of between 5 and 80% of the first predetermined number P$_{i,0}$. In certain embodiments, P$_{i,1}$ is at least 100. The resulting second message digests are sent to the server 610, which uses the set of message digests MD$_{i,1}$ and the set of PUF-i to find, through an iterative process, the set of natural numbers x$_{i,1}$ generating the data streams of response R$_{P_{i,1}}$ from the message digests H$^{Xi1}$(PW$_i$). That is to say, the server 610 receives the second message digest, applies it as a set of PUF challenges to a corresponding PUF (that is, the PUF that is set aside and identified to correspond to each password. The server 610 then receives the resulting PUF responses and compares them to the responses initially generated by the message digest corresponding to the subject password. The iterative hashing process continues until the PUF responses match the initial PUF responses. This is done for each new message digest until the responses are approximately equal to the set of initial data streams R$_{i,0}$ which were kept as references. The server tabulates the number of hashes necessary to get the same response as the initially stored response from the PUF corresponding to the subject password. From this information, the server can back-calculate the number of hashes (the second predetermined number) that the client device hashed the password, and this number may be used as the basis of computing a session key. Again, the method does not require an absolute match between the matching streams R$_{P_{i,1}}$ and the initial stream R$_{i,0}$, assuming that false acceptance rates can be ruled out. For example, a matching of 90% of the bits of the streams is perfectly acceptable, thereby tolerating drifts in the physical properties of the PUF. In certain embodiments, a bit match rate of greater than 70% is acceptable. In other embodiments, bit match rates of greater than 75, 80, 85, 90 and 95% are preferred.

Figure 6:
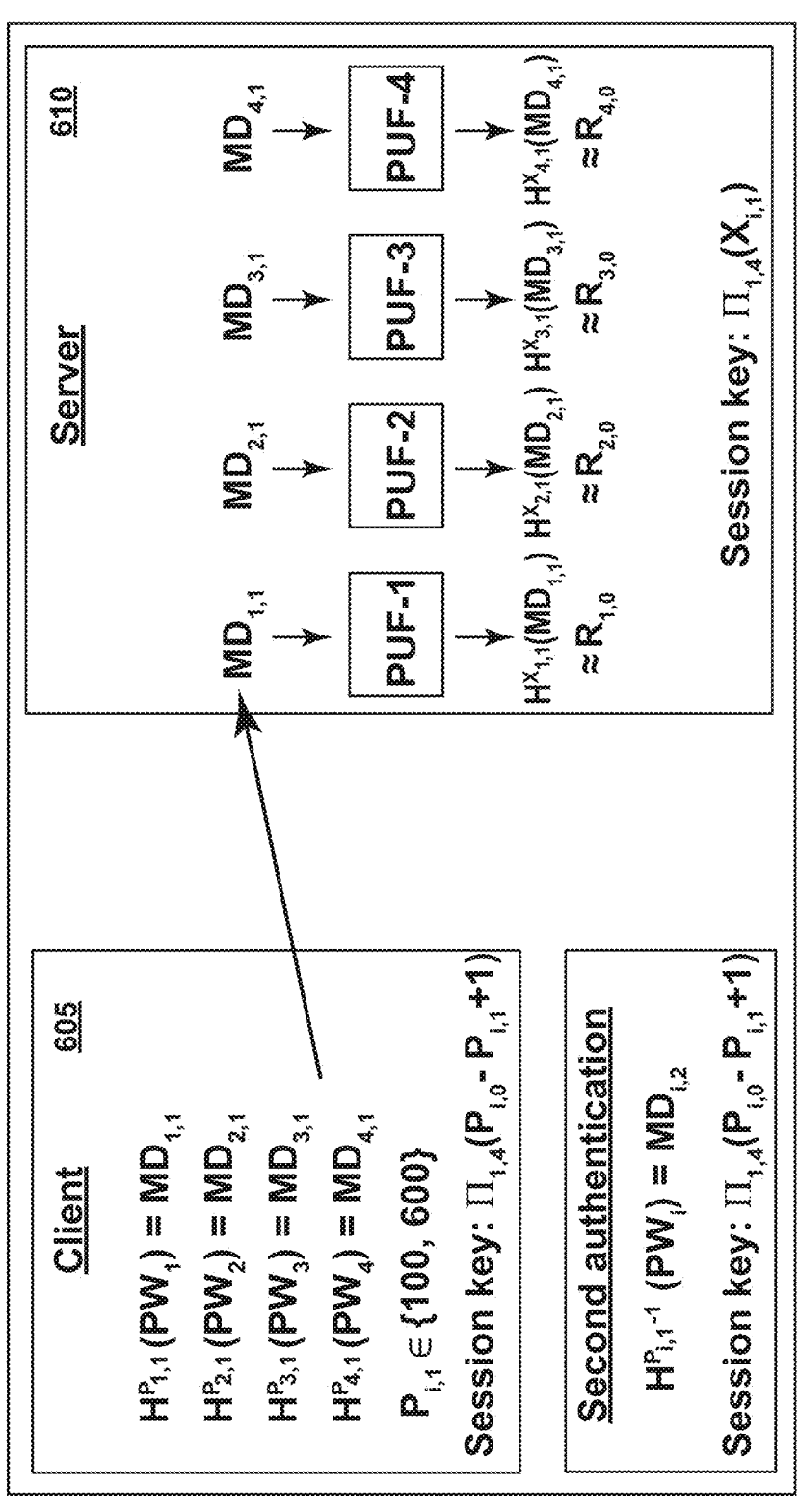
FIG. 6 depicts an exemplary process for generation of the session key with multiple PUFs.

In the embodiments of FIGS. 5 and 6, the server includes circuitry enabling concurrent and parallel measurement and reading responses from the server's bank of PUFs. With this arrangement, a concurrent search of the set of natural numbers x$_{i,1}$ keeps the latencies of the method in the 10 s range, while the client device still operates in ms. One example of a way to compute a session key from the second predetermined number of hashes, which at this point has been recovered by the server, is given by the Equation 1:

$$\text{Session key: } Sk = \prod_{i\in(1,4)} (P_{i,0} - P_{i,1}) = \prod_{i\in(1,4)} (x_{i,1}) \qquad \text{Equation 1}$$

Here, the session key is the product of the x$_{i,1}$ additional number of hashes for all passwords. The length of the session key Sk is proportional the number of passwords and PUFs used concurrently. For example, if the number x$_{i,1}$∈{1 to 1000}, a scheme generating 13 passwords for 13 PUFs generates 128-bit long session keys. The latencies of such key generation process stay below one second at the client level and below 10 s at the server level. Thus, session keys generated according to this method may be sized appropriately to act directly as seeds for cryptographic keying algorithms.

Equation 1 is but one example of method to compute the session key Sk; other examples include hashing, encryption or otherwise randomizing or expanding the product of the number of hashes. For example, the product may hashed or encrypted as provided in Equation 2. The product may also be randomized by XORing successive bit pairs, or expanded by providing the number to an expanded output function. It may also be combined or differenced (e.g., with an XOR process) with another random number or a concatenation of random numbers. The number may also be applied at a PUF challenge, and the resulting PUF responses used as or as the basis for a session key. In this case, both client and server would need a means to generate PUF responses (as in the arrangement of FIG. 4), which would require that the client have an image of the server's PUF. It will be appreciated that whatever further processing is used will have to be the same at both client and server, so if random numbers are used, the client and server side RNGs must by synchronized.

$$\text{Session key: } Sk = \text{Hash}\left[\prod_{i\in(1,4)} (x_{i,1})\right] \qquad \text{Equation 2}$$

$$\text{Session key: } Sk = \text{Encrypted}\left[\prod_{i\in(1,4)} (x_{i,1})\right] \qquad \text{Equation 3}$$

Figure 7:
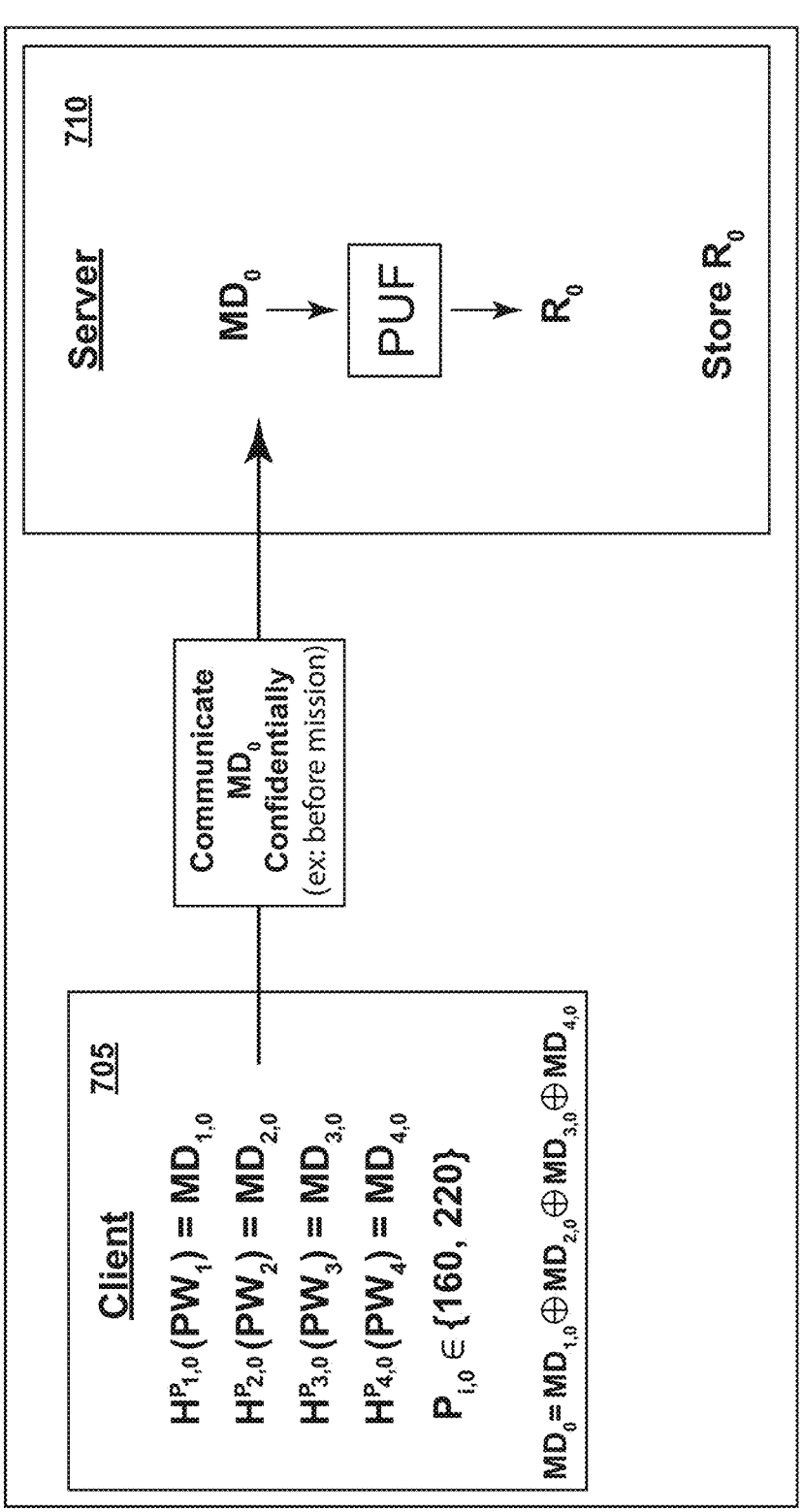
FIG. 7 depicts an exemplary process for the enrollment of several passwords for high throughput PUFs.
Figure 8:
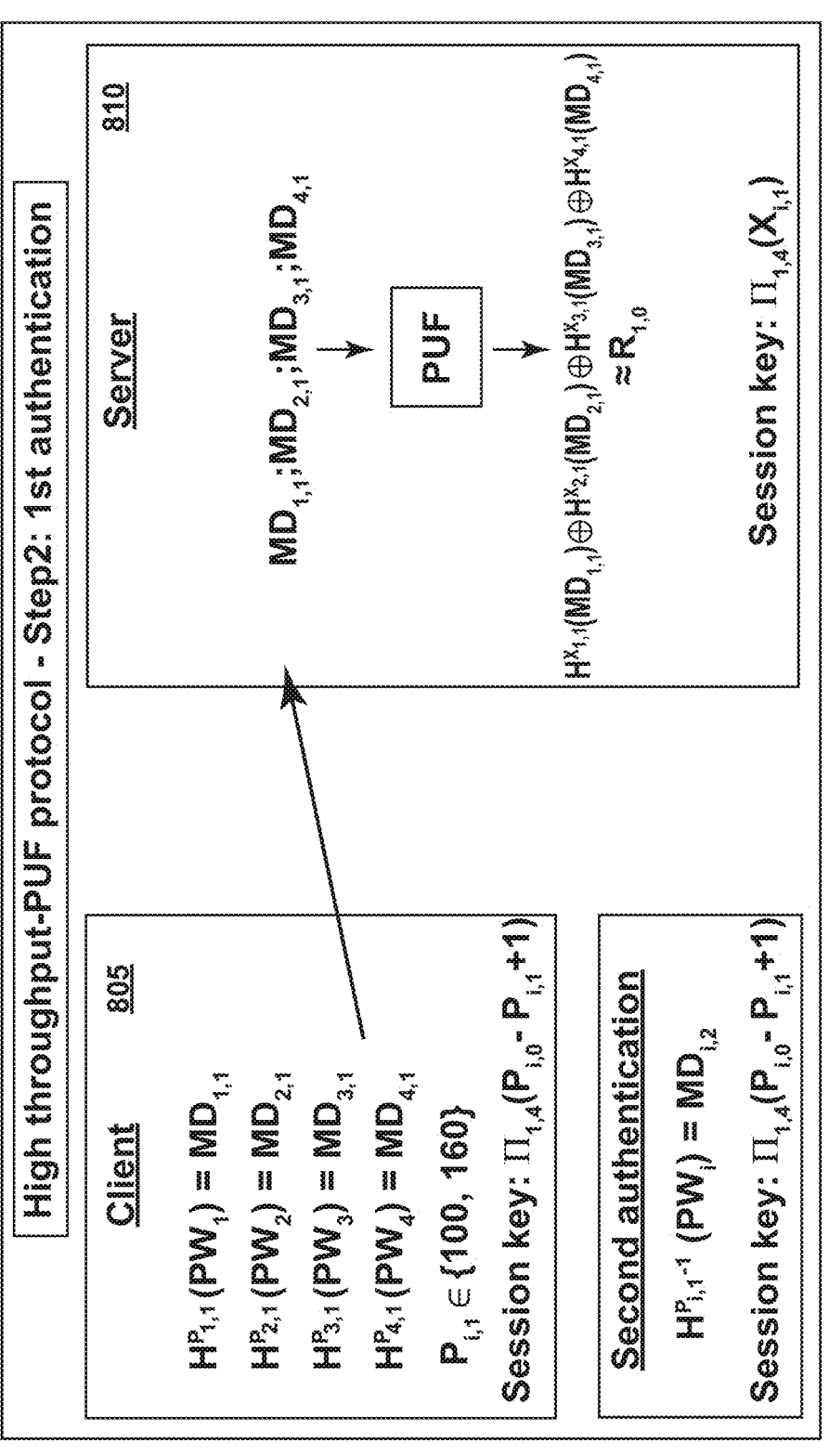
FIG. 8 depicts an exemplary process for the generation of the session key with high throughput PUFs.

Referring now to FIGS. 7 and 8, there are shown arrangements for generating session keys with high throughput PUFs. Certain addressable PUFs have higher throughput as they can generate data streams of responses in the 100 ps range which allows the generation of longer session keys.

This is the case of PUFs designed with fast random-access memories such as SRAM and MRAMs. The pseudo-homomorphic method to generate session keys with multiple hashing and PUFs, without disclosing the passwords, can incorporate XOR operations to enhance effectiveness.

FIG. 7 illustrates an enrollment process for an inventive embodiment using high throughput PUFs. As was done in the methods described previously, a client 705 receives a plurality of passwords, $PW_i$, either from a user, or from storage. The client device 705 iteratively hashes each password, $PW_i$ (the password "i"), $P_{i,0}$ times to get a series of message digests $MD_{i,0}=H^{P_{i,0}}(PW_i)$. The set of natural numbers $P_{i,0}$ (a first predetermined random number per password) is picked randomly (e.g., on the basis of a random number generated by the client RNG). The first predetermined numbers should be of moderate size. In one example, the first random numbers are in the range of between 100 and 300. In another embodiment, they are in the range of between 150 and 250. In another embodiment, the first predetermined numbers are in the range of 160-220. The client stores both the first predetermined numbers, and optionally, the message digests resulting from the sequential hashing of each password. The iteratively hashed passwords (i.e., the message digests) are sequentially XORed together as shown in FIG. 7 to generate a combined message digest $MD_0$. This message digest is sent to the server 710, which then uses $MD_0$ as or to generate challenges to the server's PUF. The server receives the corresponding data stream of responses $R_0$, which is then stored as a reference. The enrollment cycle stays approximately as short as the ones presented previously. As above, enrollment occurs in a secure environment, and the server deletes or does not store $MD_0$ after generation of the response bitstream $R_0$.

The series XOR operation, which computes $MD_0$, is an example of Boolean operation that is providing homomorphic handling of the passwords. This can be replaced by alternate functions, and numeric operations such as multiplication, and addition.

FIG. 8 illustrates a session key generation process to be used after the enrollment process described in connection with FIG. 7. As is shown in FIG. 8, the client 805 sequentially hashes again each password "i" $P_{i,1}$ times to get the message digest $MD_{i,1}=H^{P_{i,1}}(PW_i)$. The second predetermined natural numbers $P_{i,1}$ are picked randomly (e.g., with the assistance of the client's RNG), but should be considerably smaller than $P_{i,0}$ (e.g., between 100 and 160 where $P_{i,0}$ is between 160 and 220). Preferably, the second predetermined number $P_{i,1}$ is in range of between 5 and 80% of the first predetermined number $P_{i,0}$. In certain embodiments, $P_{i,1}$ is at least 100. The client device transmits the set of message digests $MD_{i,1}$ to the server 810. The session key, which is easily generated at the client, is the product of the difference between the first and second predetermined numbers the set of passwords, or $Sk=\Pi_{\{1-4\}}(P_{i,0}-P_{i,1})$ The server 810 uses the received message digests and the originally determined response R_0 to find the same session key. In order to do this, the server iteratively hashes each message digest, computes the XOR of all message digests, applies the result as a PUF challenge, retrieves the response, and then compares the response to the originally received response R_0. When the response matches R_0, the server knows how many times each password was further hashed relative to the initial message digests, and the product of these numbers is the session key. This iterative process may be summarized as follows:

Start with (a,b,c,d)=(0,0,0,0) then keep iterating to find a match;

Compute $R_{(a,b,c,d)}=H^a(MD_{1,1})\oplus H^b(MD_{2,1})\oplus H^c(MD_{3,1})\oplus H^d(MD_{4,1})$;

Compare $R_{(a,b,c,d)}$ to $R_0$; and

When the two match, $a=x_{1,1}$; $b=x_{2,1}$; $c=x_{3,1}$; $d=x_{4,1}$.

The example session key is:

$$\text{Session key: } Sk = \prod_{i \in \{1,4\}} (x_{i,1})$$

Equation 4

For example, if each of these natural numbers are 60, the session key is $60^4=1,2\times10^7$ for an entropy of 24.

It will be appreciated that the method and arrangement described in connection with FIGS. 7 and 8 greatly benefit from a high throughput PUF, and considerable processing resources on the server side. Latencies associated with this arrangement may be kept acceptably low by capping the size of the number of hashes a, b, c, d. Additionally, multiple PUFs may be used in parallel to reduce latency. For example, the server may have a separate PUF for each password. Only five PUFs are then enough to generate 128 long session keys to find the session key.

As in the embodiments described above, the computed PUF response during session key generation is unlikely to be an exact match to the originally measured response $R_0$, even when the sever is correctly measuring the PUF with the correct values of $x_1$, $x_2$, $x_3$ and $x_4$. As above, the declaration of a match does not require a BER of zero. A bit matching rate of 90% or more is acceptable in certain embodiments. In certain embodiments, a matching rate of greater than 70% is acceptable. In other embodiments, bit matching rates of greater than 75, 80, 85, 90 and 95% are preferred.

Again the session keys generated according to the method of FIGS. 7 and 8 may be used to generate encryption keys according to any of the methods set forth above, such as using the session keys as seeds for a cryptographic keying algorithm, with or without expansion or further randomization by, for example, XORing the session keys with synchronized random numbers. Additionally, in certain embodiments where the server has access to an image of a PUF in possession of the client (as in FIG. 1), the session key may be applied as PUF challenges, responses generated from the PUF (or looked up from the image), and the resulting responses used as or to generate cryptographic keys for communication.

Figure 9:
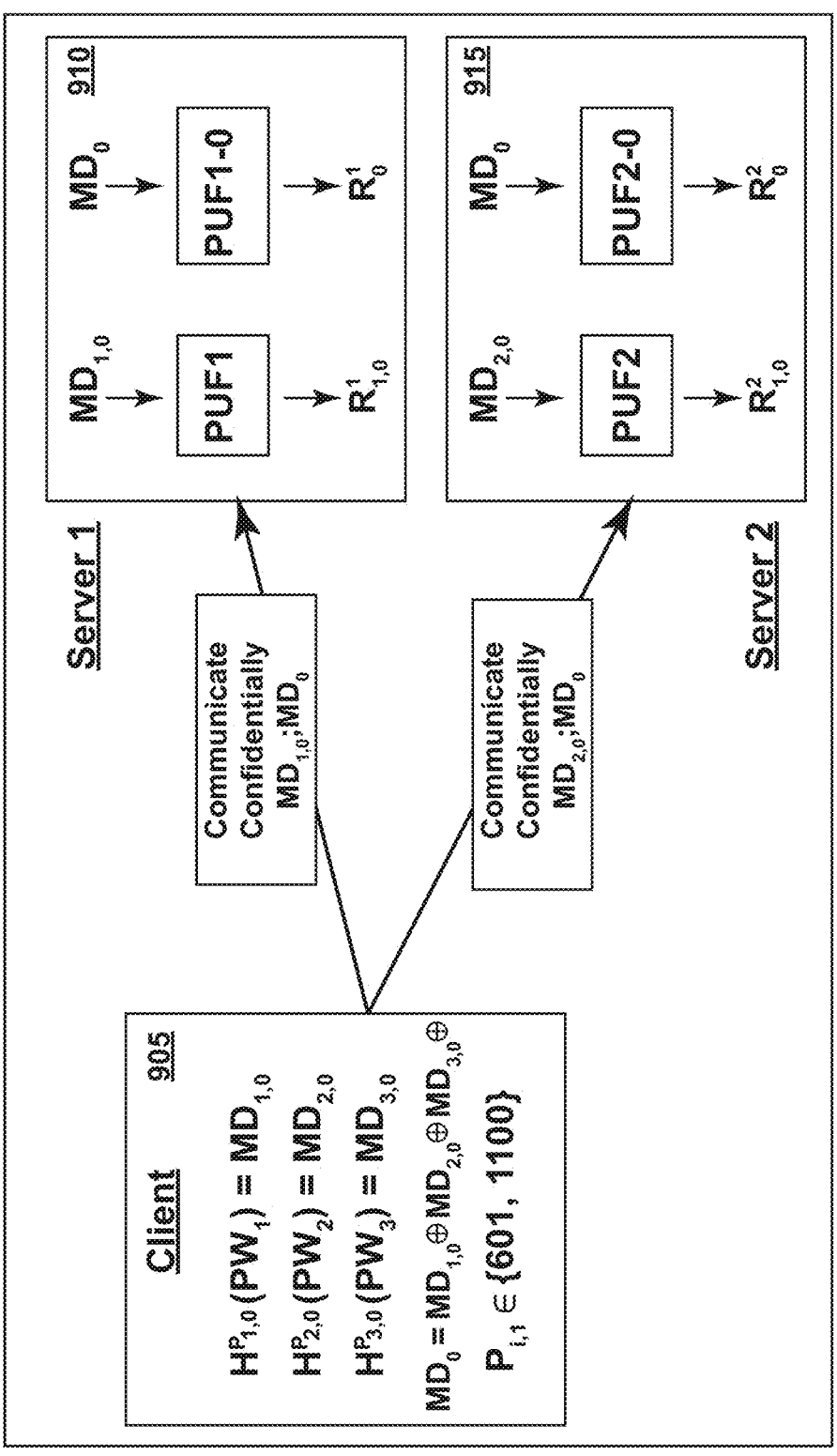
FIG. 9 depicts an exemplary process for enrollment of three passwords for two Servers.
Figure 10:
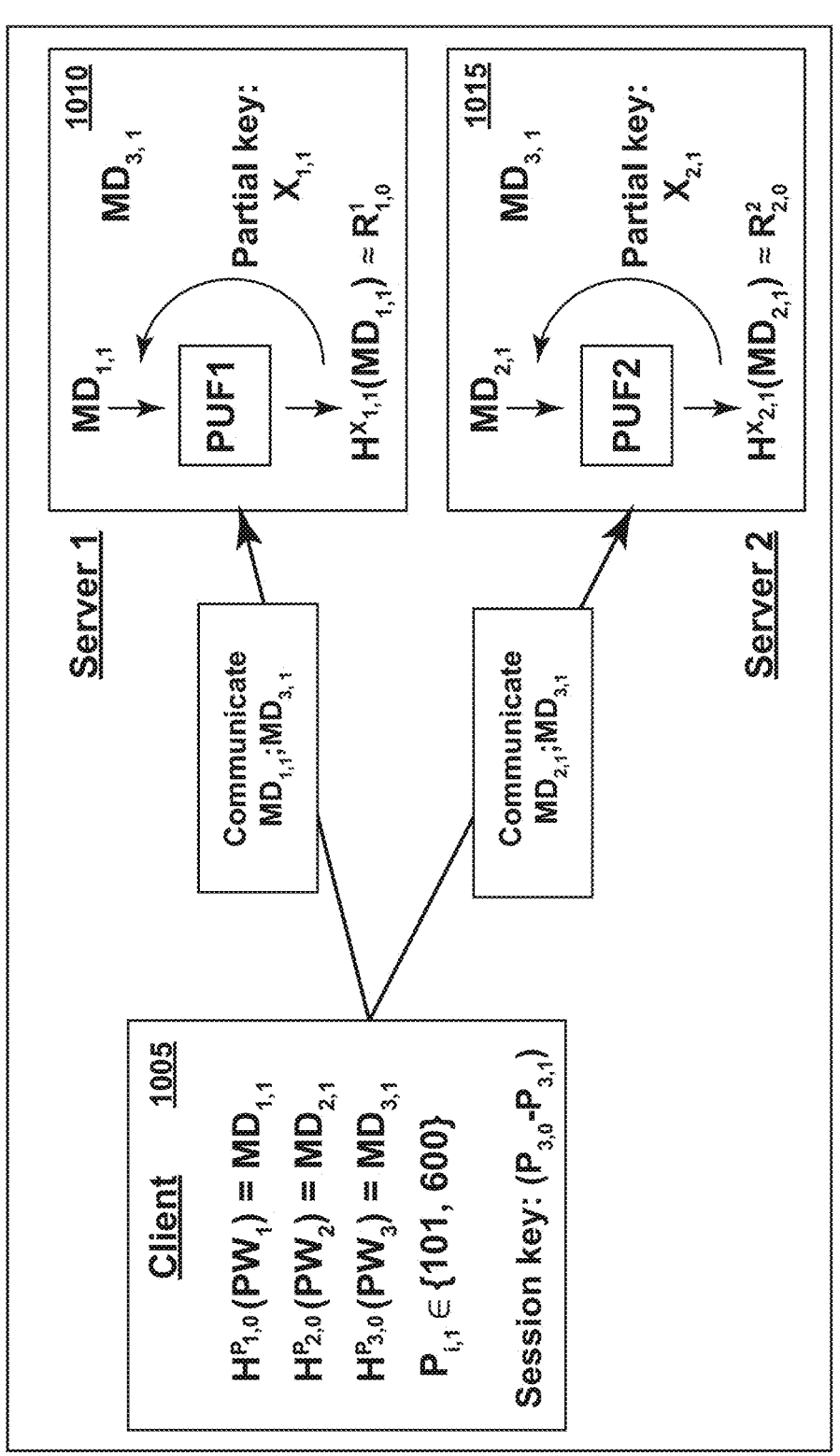
FIG. 10 depicts an exemplary process for partial session key generation.
Figure 11:
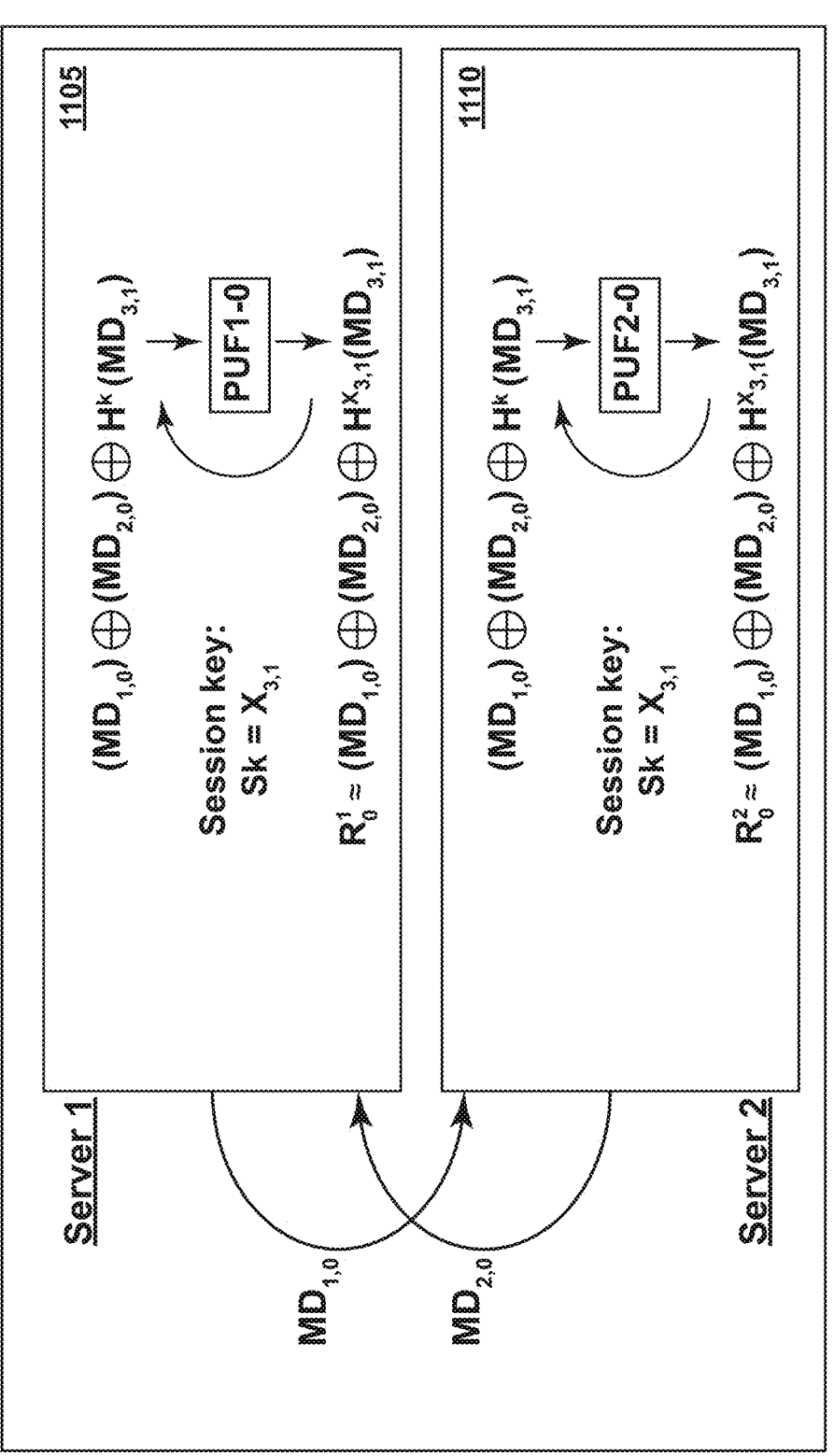
FIG. 11 depicts an exemplary process for full session key generation.

Referring now to FIGS. 9, 10 and 11, there is shown an arrangement and method in which the pseudo-homomorphic methods presented above are extended into a method in which multiple servers collaborate to generate a session key. The methods that will now be described enable a client device to authenticate a group of servers. According to these methods, if one of the servers is compromised, the entire group may be rendered unable to interact with a client device. The methods described below combine both sequential hashing and XORing, and each server is equipped with a plurality of PUFs. Preferably, each server has at least two PUFs. The exemplary method described herein uses two servers, but the method can be extended to a larger number of servers.

An arrangement and method for enrolling multiple passwords is depicted in FIG. 9. As shown, a client device 905 receives a plurality of passwords ($PW_1$, $PW_2$, etc.), preferably from a user of the client device, and optionally from storage. Optionally, the passwords may be generated by permuting previously generated or stored passwords, as described above. Client device 905 hashes each password a predetermined first number $P_{i,0}$ of times $PW_i$ (e.g., $i \in \{1$ to 3}, but the number of passwords could be much higher) to get the message digests $MD_{i,0}=H^{Pi,0}(PW_i)$. In some embodiments, there is one message digest per password. The predetermined first number of hashes, $P_{i,0}$ is picked randomly and should be relatively large enough (e.g., between 600 and 1100). As above, the first predetermined number of hashes, which may vary with each password, may be selected randomly with the assistance of an RNG operating at the client. As above, the range for the first predetermined number has a lower limit and an upper limit, which themselves, may be determined randomly. In the arrangement of FIG. 9, like embodiments above, the lower limit is 600 and the upper limit is 1100, but these bounds are exemplary. Once each password has been sequentially hashed, the plurality of hashed passwords are subject to a Boolean operation that is a function of all the hashed passwords. The result is a combined message digest $MD_0$. In the example of FIG. 9, the individual hashed passwords are sequentially XORed together to generate a data stream $MD_0$. The XOR operation is again an example of Boolean operation providing homomorphic handling of the passwords that can be replaced by alternate functions such as multiplication and addition.

The client 905 sends to each of a plurality of servers 910, 915 both the combined message digest $MD_0$ and one or more (but preferably one) of the message digests for individual passwords $MD_{1,0}$, $MD_{2,0}$, etc., as shown in FIG. 9. In the example of FIG. 9, the first server 910 gets the message digest corresponding to the first password, and the second server 915 gets the message digest corresponding to the second passwords. This is done, as in the enrollment processes described above, over a secure communication channel in a secure environment. Importantly, neither server gets the message digest corresponding to the third password. The individual password message digest $MD_{1,0}$ is applied to a first of a plurality of PUF APGs to generate a first reference response bitstream $$R_{1,0}^1.$$

The first of the plurality of servers 910 applies the combined message digest $MD_0$ to a second of a plurality of PUF APGs to generate a combined reference response bitstream $$R_0^1.$$

These reference response bitstreams $$R_{1,0}^1 \text{ and } R_0^1$$

that are stored for future reference.

The same process is performed for the second server device 915. Here, a second server 915 uses $MD_{2,0}$ and $MD_0$ to generate from its first and second PUF AGPs data streams of responses $$R_{2,0}^2 \text{ and } R_0^2$$

which are stored for future reference. The enrollment cycle stays approximately as short as the ones presented previously. As in the embodiments above, the enrollment process occurs in a secure environment. Importantly, the servers, 910 and 915 delete or do not store the message digests, and rely only on the response bitstreams going forward.

As is described above, this process may also be run on a third party machine, acting as a certification authority. In such cases, the CA may include an image of the PUFs, which in the example above are located at the first and second servers, and accordingly, the CA may generate all of the corresponding response bitstreams described above.

After the enrollment process described above, session keys may be generated, which will now be discussed in the context of FIG. 10. Referring to FIG. 10, the client 1005 again iteratively hashes the passwords a second predetermined number of times $P_{i,1}$ times, for each password, to get the message digests $MD_{i,1}=H^{Pi,1}(PW_i)$. The second predetermined numbers of hashes $P_{i,1}$ are picked randomly, but should be considerably smaller than $P_{i,0}$ (e.g., between 100 and 600 where the initial number of hashes was between 600 and 1100). Preferably, the second predetermined number is in range of between 5 and 80% of the first predetermined number. In certain embodiments, the second predetermined number is at least 100. These hashing steps result in a plurality of message digests including the iteratively hashed passwords. A plurality of the hashed passwords are sent to servers 1010 and 1015 as message digests. In the example of FIG. 10, a first server 1010 receives message digests for the first and third passwords, and the second server 1015 receives message digests for the second and third passwords.

The session key, which the client may generate, is the difference between the first predetermined number of hashes and the second predetermined number of hashes performed on the third password. This quantity is $x_{3,1}$, which is reflected in FIG. 10 as $P_{3,0}$-$P_{3,1}$. It will be noticed that the servers are not sent $MD_{3,0}$, which was the message digest created during the initial hashing step of the third password. This means that no server can calculate $P_{3,0}$ directly using $MD_{3,1}$. $MD_{3,0}$, however, is used to compute $MD_0$ which was sent to all servers. The method, then, must provide a method to recover $MD_{3,0}$, to generate session keys that match the client session key. The method described below accomplishes this in a collaborative effort requiring all servers.

The first server 1010 uses its received message digest $MD_{1,1}$ and $PUF_{1-1}$ to find the natural numbers $x_{1,1}$ through the iterative process described above. That is to say, $MD_{1,1}$ is further subjected to the same hashing algorithm employed by the client, the resulting hash, $H^{X1,1}(MD_{1,1})$ is applied as a challenge to the first PUF, and the resulting responses are compared to $$R_{1,0}^1.$$

This process continues until a server reaches a hashed version of the message digest that generates a data stream of responses matching response $$R_{1,0}^1.$$

When the responses match, the first server has uncovered a partial session key, which is the difference in the number of first and second hashes the client applied to the first password. This quantity is $x_{1,1}$. Additionally, the hashed state of the second message digest $MD_{1,1}$ after $x_{1,1}$ hashes is the same as $MD_{1,0}$, so at this point, the first server has $MD_{1,0}$. The second server 1015 performs the same process on $MD_{2,1}$ and it's first PUF, $PUF_{2-2}$ to find the natural numbers $x_{2,1}$ through an iterative process, which ends when the message digest $H^{X2,1}(MD_{2,1})$ generates a data stream of responses matching response $$R_{2,0}^2.$$

At this point, the second server 1015 has computed $x_{2,1}$, and the state of $MD_{2,1}$ after $x_{2,1}$ hashes is equal to $MD_{2,0}$. Thus, the second server has recovered $MD_{2,0}$. At this point, the servers have uncovered "partial keys" which will enable them to uncover the client's session key, which again, is the difference between the first and second predetermined number of hashes applied to the third password. As is set forth above, a perfect match with the originally stored reference response is not necessary for the iterative process to conclude. Matches within the ranges set forth above are acceptable.

Next, as is illustrated in FIG. 11, the servers 1110 and 1115 collaborate by exchanging information needed to uncover the session key. This exchange is performed, preferably as an exchange of encrypted messages digest, encrypted according to any known encryption scheme, where the receiving device can decrypt the message digest. For example, each device may generate a public-private key pair using a number generated with a RNG has a seed, and exchange public keys.

Referring now to FIG. 11, after encryption, server 1110 communicates to server 1115 the message $MD_{1,0}$; and after encryption, server 1115 communicates to server 1110 the message digest $MD_{2,0}$. Server 1110 can then uncover the full session key with the message digests $MD_{3,1}$ and its second PUF, $PUF_{1-0}$ while Server 1115 can independently uncover the full session key with the same message digest $MD_{3,1}$ and its second $PUF_{2-0}$. This is done by each server further hashing the 3rd password message digest, computing the XOR of $MD_1$, $MD_2$ and the hashed 3rd password message digest, applying the result as a challenge to its second PUF, and then comparing the result to the response generated by the second PUF by $MD_0$ during enrollment. This process iterates until the third password has been hashed enough times to generate the initial responses, $$R_0^1 \text{ and } R_0^2.$$

At that point, the number of hashes that were applied by the client to third password digest is the session key. The recovered set of session keys may be used for device authentication and key generation for communication among devices, according to the methods set forth above.

$$\text{Session key: } Sk = P_{3,0} - P_{3,1} = x_{3,0} \qquad \text{Equation 5}$$

In this protocol, each server has a first PUF to uncover a partial session key and a second PUF to uncover the full shared key. It will be appreciated that this method may be extended to any number of passwords and servers. For example, a client device interacting with 12 servers may use 13 passwords, one for each server and one to manage the collaborative effort. The session keys are preferably 128-bits long. It will be further appreciated that one advantage of this protocol is that all servers need to participate in order for any server to recover a session key. If any server is compromised (or if a hostile third actor is spoofing a server), and the server is unable to find a partial session key, no device can be authenticated and no secure communication may occur between devices using the session keys, or keys derived therefrom.

The same protocol can be used by reversing the role of the server and the client devices. The server interacts with a group of client devices each equipped with its PUFs. Session keys are generated by the server, and each client device uncovers these keys from their PUFs according to the enrollment and key generation methods described above. Client devices can collaborate to find valid session keys and use them to interact with the network. If any client device is compromised, or if a hostile actor is spoofing a client device, that device will not be capable of recovering a partial session key, and communication may be suspended among the entire network of devices Additionally, variations on the embodiments set forth above are possible. For example, the methods disclosed herein may be employed by a third-party authority, such as a certificate authority (CA), which contains an image of the PUFs of the servers. The client device communicates secretly with the CA to generate responses from the images of the PUFs. The CA communicates only the resulting responses to the servers, therefore transferring the burden of the enrollment cycle from the servers to the CA. Variations also include the generation of a large number of message digests (e.g., 1,000) from different passwords and random numbers.

It should be understood that, unless explicitly stated or otherwise required, the features disclosed in embodiments explicitly described herein and elsewhere in this disclosure may be used in any suitable combinations. Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A method of generating and using a cryptographic key element n at a server device having a first array of addressable PUF (physical-unclonable-function) devices, comprising:

receiving a first message digest, the first message digest comprising information that has been iteratively subjected to a one-way cryptographic function a first predetermined number of times;

generating, from the first message digest, a series of PUF challenges;

applying the PUF challenges to the first array of addressable PUF devices;

receiving a first response bitstream from the first array of addressable PUF devices corresponding to the PUF challenges;

storing the first response bitstream;

receiving a second message digest, the second message digest comprising the information that has been iteratively subjected to the one-way cryptographic function a second predetermined number of times, the second predetermined number of times being less than the first predetermined number of times;

iteratively subjecting the second message digest to the one-way cryptographic function until a match is achieved to the first message digest, and identifying the key element n as the number of times the second message digest was subjected to before the match is achieved to the first message digest.

2. The method of claim 1, wherein generating, from the first message digest, the series of PUF challenges, comprises, generating, from the first message, a range of addresses of devices within the first array of addressable PUF devices.

3. The method of claim 2, wherein applying the PUF challenges to the array of addressable PUF devices comprises measuring physical characteristics of PUF devices having addresses within the range of addresses of devices within the first array of addressable PUF devices.

4. The method of claim 1, further comprising using the cryptographic key element n to generate a cryptographic key, and using the cryptographic key to engage in encrypted communication with a client.

5. The method of claim 4, wherein using the cryptographic key element n to generate the cryptographic key comprises using the cryptographic key element n to generate a seed input to a cryptographic key generation algorithm.

6. The method of claim 5, wherein the server device includes an image of a second addressable array of PUF devices, and wherein using the cryptographic key element n to generate the cryptographic key comprises generating, from the cryptographic key element n, a set of addresses in the image of the second addressable array of PUF devices, retrieving previously stored responses corresponding to PUF devices in the set of addresses resulting in a second response bitstream, and using the second response bitstream to generate a cryptographic key.

7. The method of claim 6, wherein generating, from the cryptographic key element n, a set of addresses in the image of the second addressable array of PUF devices comprises XORing n with a random number generated by a random number generator, applying the resulting number to a one-way cryptographic function resulting in an output number of a predetermined length, and parsing the output number into a set of addresses in the image of the second addressable array of PUF devices.

8. The method of claim 7, further comprising transmitting the random number to a client.

9. The method of claim 1, further comprising deleting the first message digest after generating, from the first message digest, the series of PUF challenges.

10. A method of cryptographic communication with a server device having a first physical-unclonable-function ("PUF") array of addressable PUF devices, comprising:

receiving a word;

applying a one-way cryptographic function to the word a first predetermined number of times resulting in a first message digest;

transmitting the first message digest to the server device;

applying the one-way cryptographic function to the word a second predetermined number of times, the second predetermined number of times being less than the first predetermined number of times resulting in a second message digest, and transmitting the second message digest to the server device;

generating a client key reflecting a difference between the first and second predetermined number of times;

receiving a third message digest from the server device, wherein the third message digest comprises a cryptographic indicia of a server key generated with assistance from the server's first PUF array;

generating a cryptographic indicia of the client key and comparing the cryptographic indicia of the client key to the third message digest to determine whether the server key matches the client key.

11. The method of claim 10, wherein if the third message digest was generated with the server key matching the client key, engaging in cryptographic communication with the server device.

12. The method of claim 11, wherein engaging in cryptographic communication with the server device comprises generating a cryptographic key with the client key, and using the cryptographic key to engage in encrypted communication with the server device.

13. The method of claim 12, wherein using the client key to generate the cryptographic key comprises generating, from the client key, a set of addresses in a second addressable array of PUF devices, measuring physical characteristics of PUF devices having addresses within the set of addresses in the second addressable array of PUF devices resulting in a second response bitstream, and using the second response bitstream to generate the cryptographic key.

14. The method of claim 13, wherein generating, from the client key, the set of addresses in the second addressable array of PUF devices comprises XORing the client key with a random number generated by a random number generator, applying the resulting number to the one-way cryptographic function resulting in an output number of a predetermined length, and parsing the output number into the set of addresses in the second addressable array of PUF devices.

15. The method of claim 10, wherein if the third message digest was generated with the server key matching the client key, accepting a software download from the server device.

16. The method of claim 10, wherein if the third message digest was not generated with the server key matching the client key, refusing further communication with the server device.

* * * * *